United States Patent
Schaedler et al.

(10) Patent No.: US 10,895,015 B1
(45) Date of Patent: Jan. 19, 2021

(54) THIN-WALLED HIGH TEMPERATURE ALLOY STRUCTURES VIA MULTI-MATERIAL ADDITIVE MANUFACTURING

(71) Applicant: HRL Laboratories, LLC, Malibu, CA (US)

(72) Inventors: Tobias A. Schaedler, Oak Park, CA (US); John H. Martin, Ventura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 246 days.

(21) Appl. No.: 15/655,817

(22) Filed: Jul. 20, 2017

Related U.S. Application Data

(63) Continuation-in-part of application No. 14/970,521, filed on Dec. 15, 2015, now Pat. No. 9,731,471.

(Continued)

(51) Int. Cl.
| | | |
|---|---|---|
| C25D 1/02 | (2006.01) | |
| B32B 15/01 | (2006.01) | |
| B32B 15/04 | (2006.01) | |
| C22F 1/10 | (2006.01) | |
| C23C 10/38 | (2006.01) | |
| C25D 3/56 | (2006.01) | |
| C22C 19/03 | (2006.01) | |
| C22C 19/05 | (2006.01) | |

(Continued)

(52) U.S. Cl.
CPC ............ *C25D 1/02* (2013.01); *B32B 3/12* (2013.01); *B32B 15/01* (2013.01); *B32B 15/043* (2013.01); *C22C 19/002* (2013.01); *C22C 19/03* (2013.01); *C22C 19/058* (2013.01); *C22F 1/10* (2013.01); *C23C 10/38* (2013.01); *C23C 10/48* (2013.01); *C25D 3/12* (2013.01); *C25D 3/56* (2013.01)

(58) Field of Classification Search
None
See application file for complete search history.

(56) References Cited

U.S. PATENT DOCUMENTS

| | | | |
|---|---|---|---|
| 4,495,237 A | | 1/1985 | Patterson |
| 5,232,789 A | * | 8/1993 | Platz .................... C23C 4/10 148/537 |

(Continued)

FOREIGN PATENT DOCUMENTS

| | | | | |
|---|---|---|---|---|
| JP | 11154517 | * | 6/1999 | ............ C08J 9/02 |
| JP | 2012132083 | * | 7/2012 | ............ C22C 1/00 |
| WO | WO 88/03086 | | 5/1988 | |

OTHER PUBLICATIONS

Netherton et al. "Electrodeposition of Rhenium-Cobalt and Rhenium-Iron Alloys", JES, 1952, vol. 99 Issue 2, p. 44-47. (Year: 1952).*

(Continued)

*Primary Examiner* — Stefanie S Wittenberg
(74) *Attorney, Agent, or Firm* — Lewis Roca Rothgerber Christie, LLP

(57) ABSTRACT

A thin-walled metal part, and a method to fabricate such a part out of various alloys. A plurality of layers are formed, each of the layers being formed on a polymer template or on a previously formed layer. A homogenizing heat treatment is used to cause chemical elements in the layers to interdiffuse, to form a single continuous layer with a substantially uniform alloy composition.

16 Claims, 38 Drawing Sheets

| Coatings | Thickness | Process |
|---|---|---|
| Cr, Al, Ta, and/or Si, etc. | 5-40% | CVD or PVD |
| Cobalt and Rhenium | 100% | electroplating |
| Cobalt or Nickel | 20-100% | electroplating |
| Cobalt or Nickel | | PVD |
| Titanium | <10% | PVD |

Related U.S. Application Data

(60) Provisional application No. 62/460,283, filed on Feb. 17, 2017, provisional application No. 62/261,492, filed on Dec. 1, 2015, provisional application No. 62/092,750, filed on Dec. 16, 2014.

(51) Int. Cl.
  *C22C 19/00* (2006.01)
  *B32B 3/12* (2006.01)
  *C25D 3/12* (2006.01)
  *C23C 10/48* (2006.01)

(56) References Cited

U.S. PATENT DOCUMENTS

| | | | | |
|---|---|---|---|---|
| 6,066,532 | A * | 5/2000 | Chen | H01L 29/665 257/E21.429 |
| 6,254,756 | B1 * | 7/2001 | Maricocchi | C23C 10/58 205/97 |
| 7,382,959 | B1 | 6/2008 | Jacobsen | |
| 8,320,727 | B1 | 11/2012 | Jacobsen et al. | |
| 8,453,717 | B1 | 6/2013 | Roper et al. | |
| 9,096,722 | B2 | 8/2015 | Yang et al. | |
| 9,116,428 | B1 | 8/2015 | Jacobsen et al. | |
| 9,457,537 | B1 | 10/2016 | Hundley et al. | |
| 2005/0006671 | A1 * | 1/2005 | Heath | B82Y 10/00 257/211 |
| 2005/0250255 | A1 * | 11/2005 | Chen | H01L 21/312 438/127 |
| 2010/0147796 | A1 * | 6/2010 | Kubo | B32B 15/08 216/41 |
| 2010/0300669 | A1 | 12/2010 | Jacobsen et al. | |
| 2011/0172798 | A1 * | 7/2011 | Staiger | A61L 27/04 700/98 |
| 2012/0305406 | A1 * | 12/2012 | Pereira | C23C 18/30 205/164 |
| 2013/0143060 | A1 | 6/2013 | Jacobsen et al. | |
| 2013/0273347 | A1 | 10/2013 | Jacobsen et al. | |
| 2014/0087206 | A1 * | 3/2014 | Okuno | H01M 4/80 428/613 |
| 2014/0252674 | A1 | 9/2014 | Hundley et al. | |
| 2016/0160952 | A1 | 6/2016 | Schaedler et al. | |

OTHER PUBLICATIONS

Extended European Search Report dated Sep. 27, 2018 for EP Application No. 15870924.6 (17 pages).
International Search Report and the Written Opinion issued in PCT/US2015/065918, dated May 4, 2016, 11 pages.
Jacobsen, Alan J. et al., "Micro-scale Truss Structures formed from Self-Propagating Photopolymer Waveguides", Advanced Materials, 2007, vol. 19, pp. 3892-3896.
Mukherji, D. et al., "Design considerations and strengthening mechanisms in developing Co-Re-based alloys for applications at + 100° C above Ni-superalloys", Advanced Materials Research, vol. 278, (2011), pp. 539-544.
Netherton, L.E. et al., "Electrodeposition of Rhenium-Cobalt and Rhenium-Iron Alloys", Journal of the Electrochemical Society, 1952, vol. 99, No. 2, pp. 44-47.
Pingle, S.M. et al., "Collapse mechanism maps for a hollow pyramidal lattice", Proc. R. Soc. A (2010), pp. 985-1011.
Pingle, S.M. et al., "Collapse mechanism maps for the hollow pyramidal core of a sandwich panel under transverse shear", International Journal of Solids and Structures, vol. 48, (2011), pp. 3417-3430.
U.S. Appl. No. 14/197,073, filed Mar. 4, 2014.

* cited by examiner

| Coatings | Thickness | Process |
|---|---|---|
| Si, C, B, Zr, Hf and/or Y | <2% | CVD or PVD |
| Mo, W, Ta, Ti and/or Re | 1-15% | |
| Aluminum | 10-40% | pack cementation or CVD |
| Chromium | 10-40% | |
| Nickel and/or Cobalt | 100% | electroplating |

FIG. 7A

| Coatings | Thickness | Process |
|---|---|---|
| Cr, Al, Ta, and/or Si, etc. | 5-40% | CVD or PVD |
| Cobalt and Rhenium | 100% | electroplating |
| Cobalt or Nickel | 20–100% | electroplating |
| Cobalt or Nickel | | PVD |
| Titanium | <10% | PVD |

FIG. 7B

| Coatings | Thickness | Process |
|---|---|---|
| Al, Ni, Ta and/or Si | 1-20% | CVD or PVD |
| Chromium | 10-40% | |
| Cobalt and Rhenium | 100% | electroplating |

*FIG. 7C*

| Coatings | Thickness | Process |
|---|---|---|
| Multicomponent Alloy | 10-500% | cathodic arc deposition |
| Ni, Co or Cu | 100% | electroplating |

*FIG. 7D*

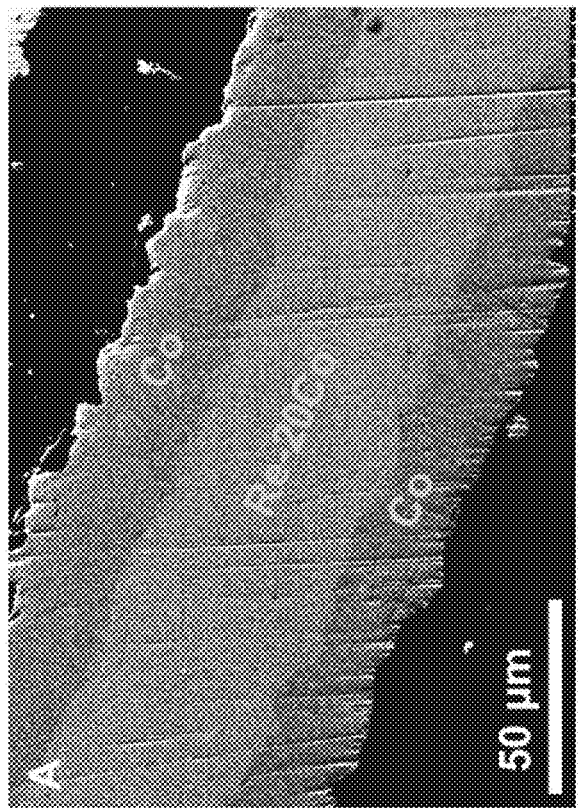
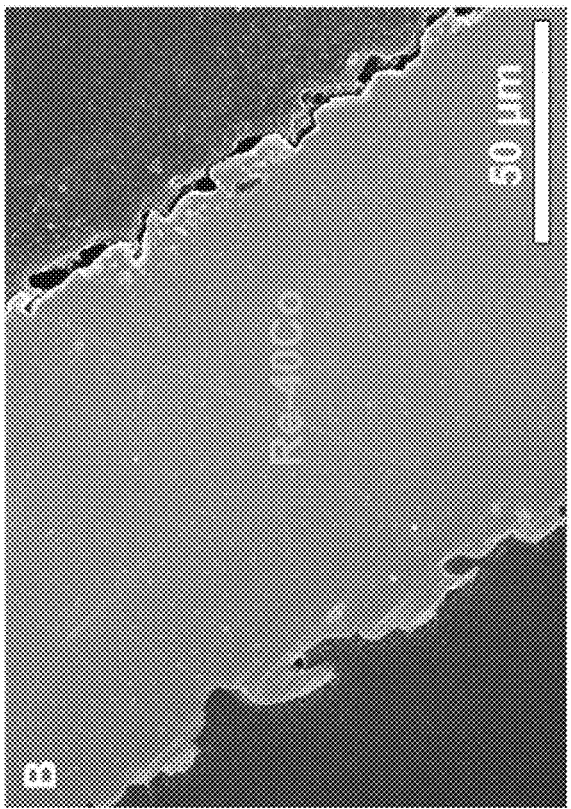
FIG. 20A
FIG. 20B

US 10,895,015 B1

THIN-WALLED HIGH TEMPERATURE ALLOY STRUCTURES VIA MULTI-MATERIAL ADDITIVE MANUFACTURING

CROSS-REFERENCE TO RELATED APPLICATION(S)

The present application claims priority to and the benefit of U.S. Provisional Application No. 62/460,283, filed Feb. 17, 2017, titled "THIN-WALLED HIGH TEMPERATURE ALLOY STRUCTURES VIA MULTI-MATERIAL ADDITIVE MANUFACTURING" and is a continuation-in-part of U.S. application Ser. No. 14/970,521, filed Dec. 15, 2015, titled "CURVED HIGH TEMPERATURE ALLOY SANDWICH PANEL WITH A TRUSS CORE AND FABRICATION METHOD", which claims priority to and the benefit of (i) U.S. Provisional Application No. 62/092,750, filed Dec. 16, 2014, titled "CURVED HIGH TEMPERATURE ALLOY SANDWICH PANEL WITH A TRUSS CORE AND FABRICATION METHOD", the entire content of which is incorporated herein by reference, and (ii) U.S. Provisional Application No. 62/261,492, filed Dec. 1, 2015 titled "MECHANICAL PERFORMANCE OF HOLLOW TETRAHEDRAL TRUSS CORES"; the entire content of each of these documents is incorporated herein by reference.

This application is also related to and incorporates by reference in its entirety, as if set forth herein in full, U.S. Pat. No. 7,382,959 ("the '959 patent").

STATEMENT REGARDING FEDERALLY SPONSORED RESEARCH OR DEVELOPMENT

This invention was made with U.S. Government support under contract No. W91CRB-10-C-0305 awarded by DARPA DSO. The U.S. Government has certain rights in this invention.

FIELD

One or more aspects of embodiments according to the present invention relate to, lightweight, heat resistant composite sandwich structures and thin-walled metal alloy structures, including rocket engine chambers, nozzles and thrusters.

BACKGROUND

Lightweight sandwich structures and core materials capable of withstanding high temperatures have multiple applications, including, for example, Acreage Thermal Protection Systems for high-speed aircraft, aircraft propulsion applications, energy-absorbing impact protection panels, and heat shields. Related art sandwich core materials for such applications may be difficult to fabricate in curved shapes and sufficiently low densities. Thus, there is a need for a low-density structure that can readily be fabricated in a curved shape, and that is capable of withstanding high temperatures.

Moreover, although methods for additive manufacturing of metallic materials have advanced recently, designing thin walled structures using such methods may be limited by the resolution of the available equipment. These resolutions may be limited to around 100 microns in powder bed approaches and greater than 500 microns in wire fed machines, and thin structures produced using powder bed approaches may ultimately be weak due to the nature of the powder bed process. Melt pool instabilities and incorporation of unmelted powder may leave rough surfaces, resulting in significant stress concentrators in the thin walled builds. A balance needs to be struck for the powder particle size or wire diameter between layer thickness required to enable timely builds, powder flowability and stable melt pool diameter. Commercially available three-dimensional (3D) printers operating with powders utilize average particle sizes between 40 microns ($\mu$m)-70 $\mu$m due to the industrially relevant yields of gas atomization processes and established safety protocols of working with metals powders in this size range. Increasing particle size beyond these ranges decreases particle flow, while decreasing size makes particle handling more difficult. Multiple powder particles need to be melted to initiate a melt pool; when producing thin walled structures in conventional additive manufacturing, however, only a small number of particles are melted, with a restricted path for heat extraction. This may result in melt pool instability and roughness, as mentioned above.

The use of conventional additive manufacturing techniques is also hindered by the limited selection of suitable and available alloys. Current additive manufacturing technologies are limited to weldable alloys, and significant research may be required to optimize processing conditions to produce repeatable structures and properties. Even if all these criteria are met, suitable powder or wire feedstock is only available for a few alloys and difficult to produce in small batches, reducing the appeal of additive manufacturing, especially for small production runs.

Only few superalloys, mostly Inconel 718 and 625 are readily 3D printed by powder bed and directed energy methods. Newer superalloys, such as Rene N5, Astroloy or CM247, are capable of higher temperature performance due to higher gamma prime phase fraction stemming from a higher Al and Ti content, but 3D printing of these compositions may not be feasible due to issues including solidification cracking, ductility-dip cracking, and strain age cracking. Only few high temperature alloys can currently be additively manufactured, with all non-weldable nickel superalloys and most refractory alloys not readily suitable for 3D printing due to hot cracking and other issues.

Thus, there is a need for an improved method for fabricating structures with wall thicknesses under 500 $\mu$m, utilizing additive manufacturing.

SUMMARY

Aspects of embodiments of the present invention are directed toward a lightweight sandwich panel structure with a complex shape and curvature, and a method to fabricate such a panel out of high temperature alloys that may be difficult to process into sandwich panels using related art methods. Embodiments of a micro-truss core structure that offer high specific strength and stiffness while allowing for curvature, and methods for depositing multiple layers of metals that can be interdiffused into complex alloys, are provided. An additional aspect of embodiments is that by fabricating a core of a panel from a polymer template, limitations on shape and curvature may be overcome, and by coating the polymer template, new core materials and low densities may be enabled. The architecture for the core may be designed for the coating processes, e.g., to overcome line-of-sight limitations and to minimize or reduce weak points introduced by hollow nodes.

Aspects of embodiments of the present invention are further directed toward a thin-walled metal part, and a method to fabricate such a part out of various alloys. A plurality of layers are formed, each of the layers being formed on a polymer template or on a previously formed layer. A homogenizing heat treatment is used to cause chemical elements in the layers to interdiffuse, to form a single continuous layer with a substantially uniform alloy composition.

In one embodiment, the article includes, as a major component, a substance selected from the group consisting of nickel, cobalt, iron, and combinations thereof; a second coating layer including chromium or NiCr, the second coating layer having a Cr thickness of 10-40% of the thickness of the first coating layer, a third coating layer of aluminum or NiAl, the third coating layer having a Al thickness of 10-40% of the thickness of the first coating layer.

In one embodiment, the article includes, as a major component, a substance selected from the group consisting of Mo, W, Ta, Ti, and Re, and combinations thereof.

In one embodiment, the article includes, as a major component, a substance selected from the group consisting of Si, C, B, Zr, Hf, and Y, and combinations thereof.

According to an embodiment of the present invention there is provided a method for forming a structure including walls thinner than 0.5 mm, the method including: forming a polymer template; coating the template with a first coating layer including a metal; coating the template by electroplating with a second coating layer including one or more chemical elements selected from the group consisting of Ni, Co, Fe, Cu, Cr, Zn, Sn, Pb, Cd, Ag, Au, Pd, Pt, Rh, Mn, and Ir, the composition of the second coating layer being different from the composition of the first coating layer; removing the polymer template to form a first hollow thin-walled structure; coating the first hollow thin-walled structure with a third coating layer including one or more chemical elements to form a second hollow thin-walled structure performing a heat treatment of the second hollow thin-walled structure to form a third hollow thin-walled structure, the performing of the heat treatment including heating the hollow structure to a first temperature and maintaining the temperature of the hollow structure at or above the first temperature during a first time interval, the first temperature and the first time interval being selected such that the heat treatment causes the elements of the first coating layer, the elements of the second coating layer, and the elements of the third coating layer to interdiffuse to form a single continuous layer including one or more chemical elements, the concentration of each chemical element of the continuous layer varying by less than 10% within the continuous layer.

In one embodiment, the forming of the template includes utilizing an act selected from the group consisting of stereolithography, three dimensional (3D) printing, additive manufacturing and injection molding.

In one embodiment, the act of coating the template with the first coating layer includes utilizing an act selected from the group consisting of electroplating, electroless plating, chemical vapor deposition, physical vapor deposition, spray coating, and combinations thereof.

In one embodiment, the act of: coating the first hollow thin-walled structure with the third coating layer includes utilizing an act selected from the group consisting of aluminum diffusion coating, chromium diffusion coating, titanium diffusion coating and pack cementation.

In one embodiment, the removing of the template includes utilizing an act selected from the group consisting of a base etching, an acid etching, a plasma etching, a solvent bath processing, a thermal decomposition and a melting.

In one embodiment, the first temperature is at least 1100° C. and the first time interval is at least 24 hours.

In one embodiment, the method includes joining two facesheets to a top surface and a bottom surface of the third hollow thin-walled structure, utilizing an act selected from the group consisting of brazing, transient liquid bonding, welding, and adhesive bonding.

In one embodiment, the method includes, as a major component, a substance selected from the group consisting of nickel, cobalt, iron, and combinations thereof, and wherein the method further includes, after the removing of the template: depositing one or more layers of chromium, to a combined thickness of 10% to 40% of the thickness of the first layer, utilizing an act selected from the group consisting of electroplating, chemical vapor deposition and pack cementation; depositing one or more layers of aluminum, to a combined thickness of 10% to 40% of the thickness of the first layer, utilizing an act selected from the group consisting of electroplating, chemical vapor deposition and pack cementation; depositing, to a thickness of 1% to 15% of the thickness of the first layer, a layer including, as a major component, a substance selected from the group consisting of Mo, W, Ta, Ti, and Re, and combinations thereof; and depositing, to a thickness of less than 2% of the thickness of the first layer, a layer including, as a major component, a substance selected from the group consisting of Si, C, B, Zr, Hf, Y, and combinations thereof.

In one embodiment, the first coating layer is metallic and renders the template conductive, and the second coating layer includes, as a major component, a combination of: cobalt; and rhenium in a concentration of 10 to 70 percent by weight (wt. %); the coating of the template with the second coating layer includes utilizing electroplating; the third coating layer includes, as a major component, a substance selected from the group consisting of chromium, nickel, aluminum, tantalum, silicon, and combinations thereof; and the coating of the template with the third coating layer includes utilizing an act selected from the group consisting of electroplating, chemical vapor deposition, and pack cementation.

In one embodiment, the method includes, as a major component, a substance selected from the group consisting of nickel, cobalt, iron, and combinations thereof; and the coating with the third coating layer includes depositing a metal alloy utilizing an act selected from the group consisting of cathodic arc deposition, direct current (DC) bias field cathodic arc physical vapor deposition, and plasma enhanced magnetron sputtering.

In one embodiment, the method includes removing the first and second coating layer with a selective etch.

According to an embodiment of the present invention there is provided a method for forming a thin-walled structure, the method including: forming a polymer template; forming a plurality of coating layers, each of the coating layers being formed on the polymer template or on a previously formed layer, the forming of the plurality of coating layers including: forming a first coating layer on the polymer template, the first coating layer including one or more chemical elements, including at least 1% by weight of a first metal chemical element; forming a second coating layer on the first coating layer, the second coating layer including one or more chemical elements, including at least 1% by weight of a second metal chemical element, different from the first metal chemical element; removing the polymer template; and performing a heat treatment of the plurality of coating layers, after removing the polymer template, the performing of the heat treatment including heating the plurality of coating layers to a first temperature and maintaining the plurality of coating layers at or above the first temperature during a first time interval, the first temperature and the first time interval being selected such that the chemical elements of the first coating layer and the chemical elements of the second coating layer interdiffuse to form a single continuous layer having a thickness less than 500 microns and including two different chemical elements, each chemical element of the single continuous layer having a molar concentration varying by less than 10% within the single continuous layer.

In one embodiment, the removing of the polymer template is performed before the forming of the second coating layer.

In one embodiment, the forming of the first coating layer includes depositing the first coating layer utilizing a process selected from the group consisting of electrodeposition, electroless deposition, chemical vapor deposition, physical vapor deposition, spray coating, and combinations thereof.

In one embodiment, the forming of the first coating layer includes depositing a first sub-layer of titanium utilizing electron beam evaporation and, after depositing the first sublayer of titanium, depositing a second sub-layer of platinum utilizing electron beam evaporation.

In one embodiment, the method includes removing a portion of the first coating layer in an area sufficiently large to allow the polymer removal fluid to access the polymer template.

In one embodiment, the forming of the second coating layer includes depositing the second coating layer utilizing electrodeposition.

In one embodiment, the depositing of the second coating layer utilizing electrodeposition includes co-depositing cobalt and rhenium.

In one embodiment, the method includes a third metal chemical element.

In one embodiment, the forming of the third coating layer includes depositing material utilizing a process selected from the group consisting of aluminum diffusion coating, chromium diffusion coating, titanium diffusion coating, cathodic arc deposition, direct current (DC) bias field cathodic arc physical vapor deposition, plasma enhanced magnetron sputtering, and pack cementation.

In one embodiment, the forming of the third coating layer includes depositing chromium or aluminum utilizing pack cementation.

In one embodiment, the single continuous layer includes: a nominal composition consisting of the following nominal proportions: 66.5% by weight nickel; 34% by weight copper; 1% by weight aluminum; and 0.5% by weight titanium, or a composition in which each component differs from its respective nominal proportion by +/−10% of its respective proportion.

In one embodiment, the single continuous layer includes: a nominal composition consisting of the following nominal proportions: 73% by weight nickel; 19% by weight chromium; 7% by weight aluminum; and 1% by weight titanium, or a composition in which each component differs from its respective nominal proportion by +/−20% of its respective proportion.

In one embodiment, the single continuous layer includes: a nominal composition consisting of the following nominal proportions: 70% by weight rhenium; and 30% by weight cobalt, or a composition in which each component differs from its respective nominal proportion by +/−30% of its respective proportion.

In one embodiment, the composition includes: between 10% by weight and 30% by weight chromium and/or between 3% by weight and 15% by weight aluminum.

In one embodiment, the single continuous layer includes at least 1% by weight of a chemical element selected from the group consisting of Ni, Co, Fe, Cu, Cr, Zn, Sn, Pb, Cd, Ag, Au, Pd, Pt, Rh, Mn, and Ir.

In one embodiment, the forming of the polymer template includes utilizing an act selected from the group consisting of stereolithography, three dimensional printing, additive manufacturing and injection molding.

In one embodiment, the removing of the polymer template includes utilizing an act selected from the group consisting of a base etching, an acid etching, a plasma etching, a solvent bath processing, a thermal decomposition and a melting.

In one embodiment, the first temperature is at least 1100° C. and the first time interval is at least 24 hours.

In one embodiment, the method includes, as a major component, a substance selected from the group consisting of Mo, W, Ta, Ti, and Re, and combinations thereof; and depositing, to a thickness of less than 2% of the thickness of the first coating layer, a layer including, as a major component, a substance selected from the group consisting of Si, C, B, Zr, Hf, Y, and combinations thereof.

In one embodiment, the first coating layer includes, as a major component, a combination of: cobalt; and rhenium in a concentration of 10% by weight to 70% by weight; and the second coating layer includes, as a major component, a substance selected from the group consisting of chromium, nickel, aluminum, tantalum, silicon, and combinations thereof.

According to an embodiment of the present invention there is provided an article including: a polymer template; a first coating layer on the polymer template, the first coating layer including one or more chemical elements, including at least 1% by weight of a first metal chemical element; and a second coating layer on the first coating layer, the second coating layer including one or more chemical elements, including at least 1% by weight of a second metal chemical element, different from the first metal chemical element, the first and second coating layers having different compositions.

According to an embodiment of the present invention there is provided a thin-walled structure, including: a first layer including one or more chemical elements, including at least 1% by weight of a first metal chemical element; and a second layer on the first layer, the second layer including one or more chemical elements, including at least 1% by weight of a second metal chemical element, different from the first metal chemical element, the first and second layers having different compositions, and the thin-walled structure having a shape of a rocket nozzle.

BRIEF DESCRIPTION OF THE DRAWINGS

Features, aspects, and embodiments are described in conjunction with the attached drawings, in which:

FIGS. 2A-21 are schematic cross sectional views of sandwich structures according to embodiments of the present invention;

FIG. 6 is an illustrated flow chart of a method for fabricating a sandwich panel according to an embodiment of the present invention;

FIGS. 7A-7D are lamination diagrams showing deposited layers according to embodiments of the present invention;

FIG. 8 is a chart of strength as a function of density of related art materials and of embodiments of the present invention;

FIG. 9 is a schematic diagram of a system for forming a core template with additional features according to an embodiment of the present invention;

FIG. 10 is a cross-sectional view of a sandwich structure on standoffs according to an embodiment of the present invention;

FIG. 11 is a perspective view of a truss core according to an embodiment of the present invention;

FIG. 12 is a schematic cross-sectional view of a truss core according to an embodiment of the present invention;

FIG. 13 is a schematic cross-sectional view of a sandwich according to an embodiment of the present invention;

FIG. 15 is a top view photograph of two partially overlapping truss cores according to an embodiment of the present invention;

FIG. 16 is a flow chart of a method of forming a thin-walled alloy structure, according to an embodiment of the present invention;

FIG. 17 is an illustrated process diagram of a method for fabricating a thin-walled alloy structure, according to an embodiment of the present invention;

FIG. 19 is a calculated phase diagram of Co—Re, according to an embodiment of the present invention;

FIG. 20A is a micrograph of a thin-walled structure before homogenization, according to an embodiment of the present invention;

FIG. 20B is a micrograph of a thin-walled structure after homogenization, according to an embodiment of the present invention;

DETAILED DESCRIPTION

The detailed description set forth below in connection with the appended drawings is intended as a description of exemplary embodiments of a curved high temperature alloy sandwich panel with a truss core and fabrication method provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

One embodiment of this invention is a curved acreage thermal protection system (TPS) with a cobalt-rhenium alloy core that may be capable of withstanding 30% higher temperatures than a related art metallic TPS based on nickel alloy honeycomb, while offering lighter weight and the complex shapes necessary for many applications. Embodiments of the present invention provide lightweight sandwich panels that can be fabricated from high temperature alloys. Curved panels and complex shapes may be fabricated using the disclosed methods, and very low densities may be achieved, since the alloy may be deposited as a thin coating instead of being rolled from a cast block to thinner and thinner sheets.

For example, the related art sheet rolling approach used to manufacture honeycomb cores limits the available alloys since many high temperature alloys are not ductile enough to allow rolling them into thin sheets.

Fasteners may be embedded in panels fabricated according to embodiments of the present invention. The core may be open-celled which has advantages for multifunctionality, such as thermal management, over related art structures such as closed-celled honeycombs or foams. With embodiments of the present invention it may be possible to grade the core density and increase strength and stiffness in certain locations, e.g. around fasteners or where high loads occur, while reducing density and saving weight, where it is not needed.

Figure 1:
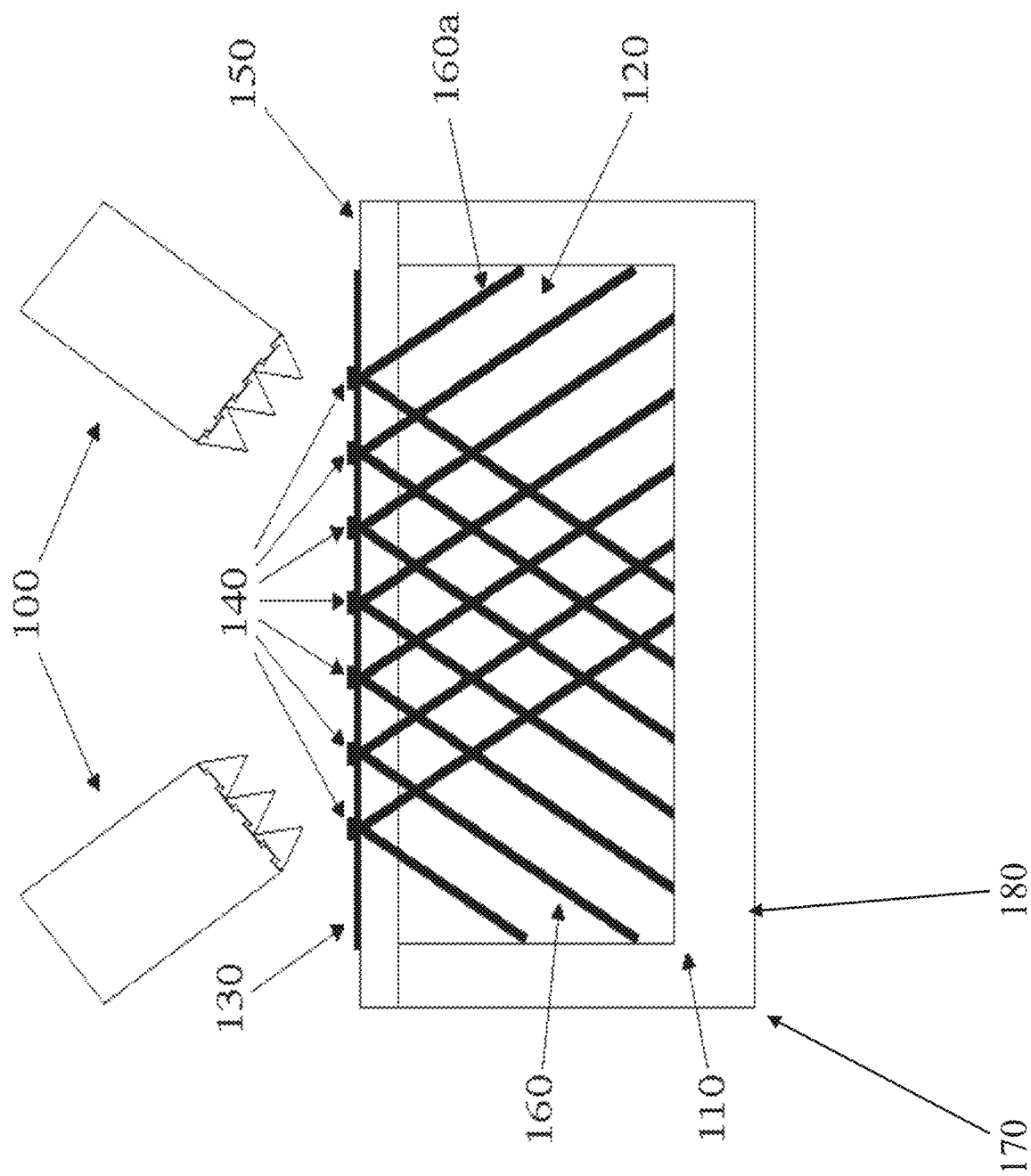
FIG. 1 is a schematic diagram of a system for forming a core template according to an embodiment of the present invention.

Referring to FIG. 1, in one embodiment a truss core is formed by first forming a polymer micro-truss, according, for example, to a method disclosed in the '959 patent. A polymer core template is formed by using a fixed light input (collimated UV light) to cure (polymerize) polymer optical waveguides, which can self-propagate in a three-dimensional (3D) pattern. Some liquid monomers, referred to as photomonomers, polymerize when exposed to light (e.g., UV light), and undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a self-propagating photopolymer waveguide structure with approximately (about) the same cross-sectional dimensions along its entire length.

With reference to FIG. 1, a system for forming a 3D polymer core template according to an embodiment of the present invention includes one or more collimated light sources 100, a reservoir (mold) 110 having a volume of photomonomer resin 120 that will polymerize at a wavelength of collimated light beams provided by the light sources 100, and a patterning apparatus, such as a mask 130 with multiple apertures (open areas) 140.

Each of the apertures 140 has a given shape and dimension substantially matching a cross section geometry of a waveguide (e.g., waveguide 160a). Between the mask 130 and the monomer 120, there may be a substrate 150. Here, in FIG. 1, a truly 3D network can be formed because the intersecting polymer waveguides 160 will simply polymerize together, but will not interfere with waveguide propagation. Also, the spacing between the plurality of waveguides 160 corresponds with the pattern of the plurality of apertures 140. The pattern of the apertures 140 may, for example, be in a square pattern or in a hexagonal pattern. The hole (aperture) diameter and spacing, in the mask 130, and the number of waveguides 160 formed from each of the apertures 140 may be adjusted to adjust the open volume fraction (i.e. open space) of the formed 3D core template. These characteristics may be constant or may vary, as a result of corresponding variations in the mask hole size, shape, or spacing, across the core template. The core template formed in this manner may be a periodic or quasi-periodic structure, composed of unit cells including truss members 170 interpenetrating at nodes 180. The depth of the reservoir may be selected to correspond to the thickness of the core template to be formed.

When a core template has been formed within the reservoir of photomonomer, the core template may be removed from the reservoir, and the excess photomonomer may be allowed to drain off of the core template. In one embodiment the core template is extracted from the reservoir and cleaned utilizing a hot air process. Hot air, e.g., air between 30° C. to 120° C., is blown over the core template with a pressure of 5 pounds per square inch gauge (PSI gauge) to 100 PSI gauge to remove excess photomonomer resin. During this process the core template can be suspended over a porous support such as a grate to allow resin to drop away or placed on a porous support such as paper towels to absorb the excess resin. In this state the core template is referred to as a green state core template, which may be flexible and amenable to being molded or shaped.

The green state polymer core template may be molded or shaped to form a shape different from a flat sheet. This may be accomplished, e.g., by placing the green state core template into a suitable mold composed of two halves, and pressing the halves together with enough force to cause the green state polymer micro-truss structure to assume the shape of the space left between the halves. In other embodiments the green state core template may be shaped by hand or using tools, or the green state core template may be draped over a curved surface and caused by gravity to conform to the surface. In other embodiments the green state core template is shaped by a process selected from the group consisting of bending, stretching, impressing, embossing and combinations thereof. Once the green state polymer micro-truss structure has been shaped, it may be post-cured while being held in place, e.g., by again exposing the green state core template to ultraviolet (UV) light, or by heating it in an inert environment. For UV light curing, a Fusion Box with an H+ bulb, available from Hereaus Noblelight America, of Gaithersburg, Md., may be used, and the green state core template may for example be exposed to UV light with an irradiance of about 100 mW/cm$^2$ for 2 minutes. To post-cure the green state core template using heat, it may for example be heated to 160° C. in a vacuum or in a nitrogen atmosphere. A post-cure process using UV light may be followed by a second post-cure process using heat. The post-curing process completes the crosslinking of the monomers forming the core template. Once post-cured, the core template is referred to as a cured core template, and it may be sufficiently rigid to reliably hold its shape.

In other embodiments a cured core template may be shaped (after curing) by heating it above the glass transition temperature of the polymer, bending it, and cooling it to fix the curvature.

Figure 2C:
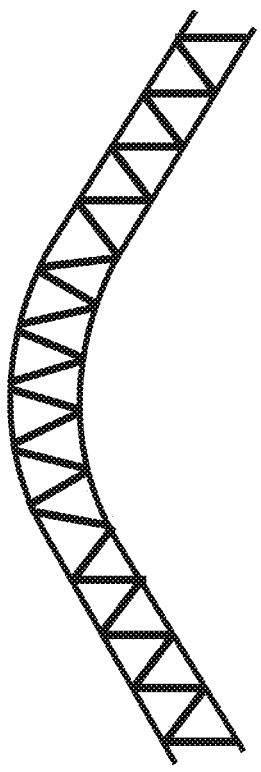
Figure 2D:
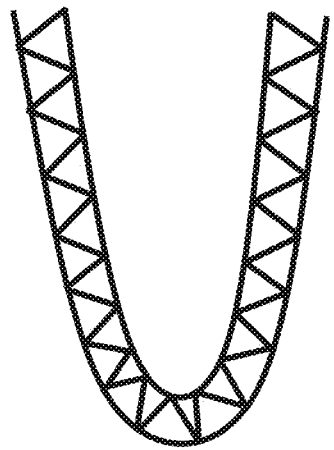
Figure 2A:
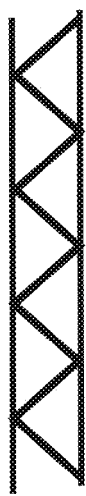
Figure 2B:
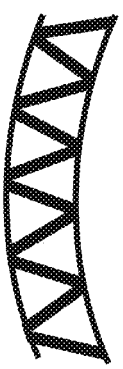

A cured core template formed in this manner may be coated with metal, and the core template may then be removed, e.g., by etching, to leave a hollow metal structure or "truss core". Other processing acts may be used as described in further detail below. Referring to FIG. 2A, a sandwich panel may be formed by securing two facesheets to a truss core, e.g., a sheet of hollow metal truss. If the core template is formed into a curved shape before curing, then the truss core may have a correspondingly curved shape, to which curved facesheets may be secured, to form sandwich structures such as those illustrated in FIGS. 2B-2D. The embodiment of FIG. 2D may be suitable, for example, for use as a blunt leading edge in an aerospace vehicle. As used herein, a "facesheet" is a sheet secured to an exterior surface of a truss core. A "sheet" as used herein is a solid shape that has two major surfaces that are locally substantially parallel, the surface area of the two major surfaces being at least 80% of the total surface area of the sheet.

The strength of the sandwich panel may be greater when, as illustrated in FIGS. 2A-2D, all of the hollow nodes of the truss core are on, or directly adjacent to, a face sheet, with no nodes being within the bulk of the truss core, away from the face sheets. Such hollow nodes that are not directly on a face sheet, i.e. "unconstrained" nodes, may act as buckling initiation sites and lower the strength of the core. A core structure may be, for example, a pyramidal truss configuration where three or four struts or "truss members" meet at a node that is in contact with either the top or bottom face sheet.

Figure 2E:
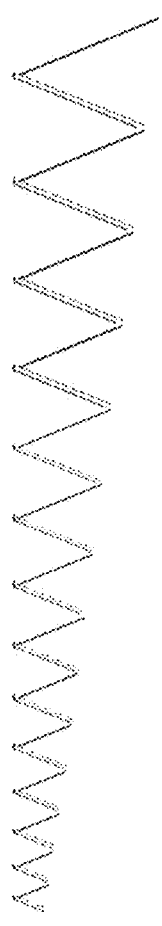
Figure 2F:
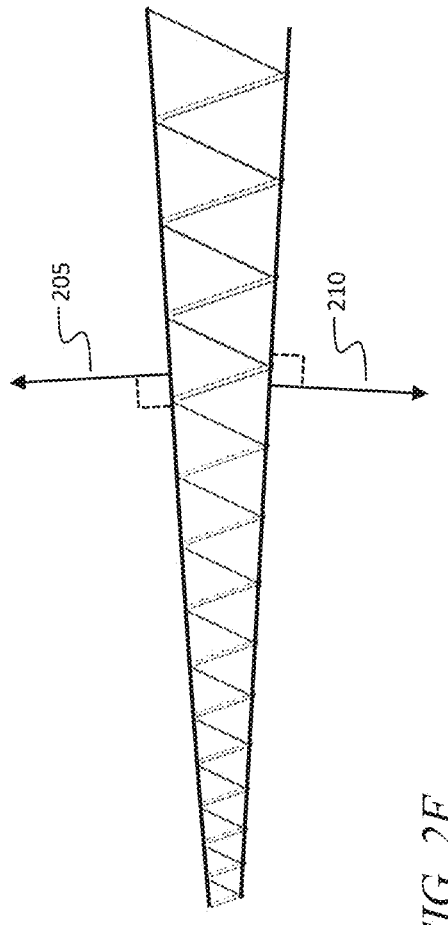
Figure 2G:
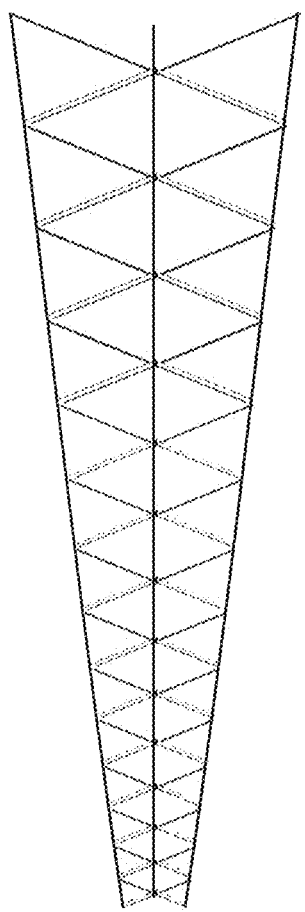

Truss cores and sandwich panels may be fabricated with graded cores, e.g., by using a mask with graded aperture spacing and a reservoir with a sloping bottom. Referring to FIG. 2E, a truss core with node spacing of the truss core and thickness of the truss core increasing in a graded manner from left to right, for example, may be used to form a tapered sandwich panel (FIG. 2F) or a tapered sandwich panel with an internal sheet (FIG. 2G). Facesheets in such a structure, e.g., the structure of FIG. 2F may not be parallel. A first facesheet may have a first outward-pointing normal vector (or "normal") 205, and a second facesheet may have a second outward-pointing normal 210, and the first and second normal vectors may not be parallel, i.e., the angle between them may not be 180 degrees. In one embodiment the angle between the first normal and the second normal is less than 175 degrees. Such structures may be used as a part of a leading edge or flight control surface. As in the embodiments of FIGS. 2A-2D, truss members interconnect at nodes, and the nodes at the bottom are connected to a first sheet, while the nodes at the top are connected to a second sheet, and the structure has no freestanding nodes not connected to either a facesheet or an internal sheet, such as the internal sheet of FIG. 2G. Freestanding hollow nodes may be weak points; the facesheets constrain the nodes and thereby may increase the stiffness and strength of the core.

Figure 2I:
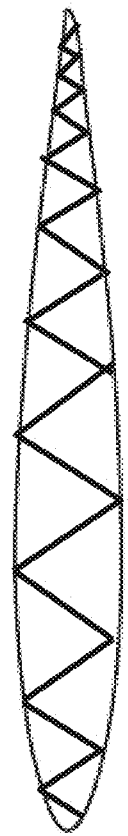
Figure 2H:
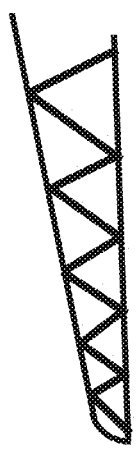

A truss core may be fabricated using a coating process, like sputtering or physical vapor deposition, that is somewhat restricted to deposition in the line-of-sight, or a process, like electrodeposition (or "electroplating"), that depends on an electric field between the surface to be coated and an anode. A single-layer truss structure in which the cores provide good line-of-sight access to the surfaces of the truss members and nodes (like the structures illustrated in FIGS. 2A-2F) may be well suited for fabrication using these processes. Multiple single-layer cores may then be combined with one or more internal sheets and face sheets to form multi-layer sandwich structures such as the one of FIG. 2G. FIG. 2H shows a graded core with a single, wrap-around curved facesheet, and FIG. 2I shows a structure, also with a single, wrap-around curved facesheet, and a dual-graded core, in which the node spacing first increases, and then decreases, in proceeding from left to right.

Figure 3A:
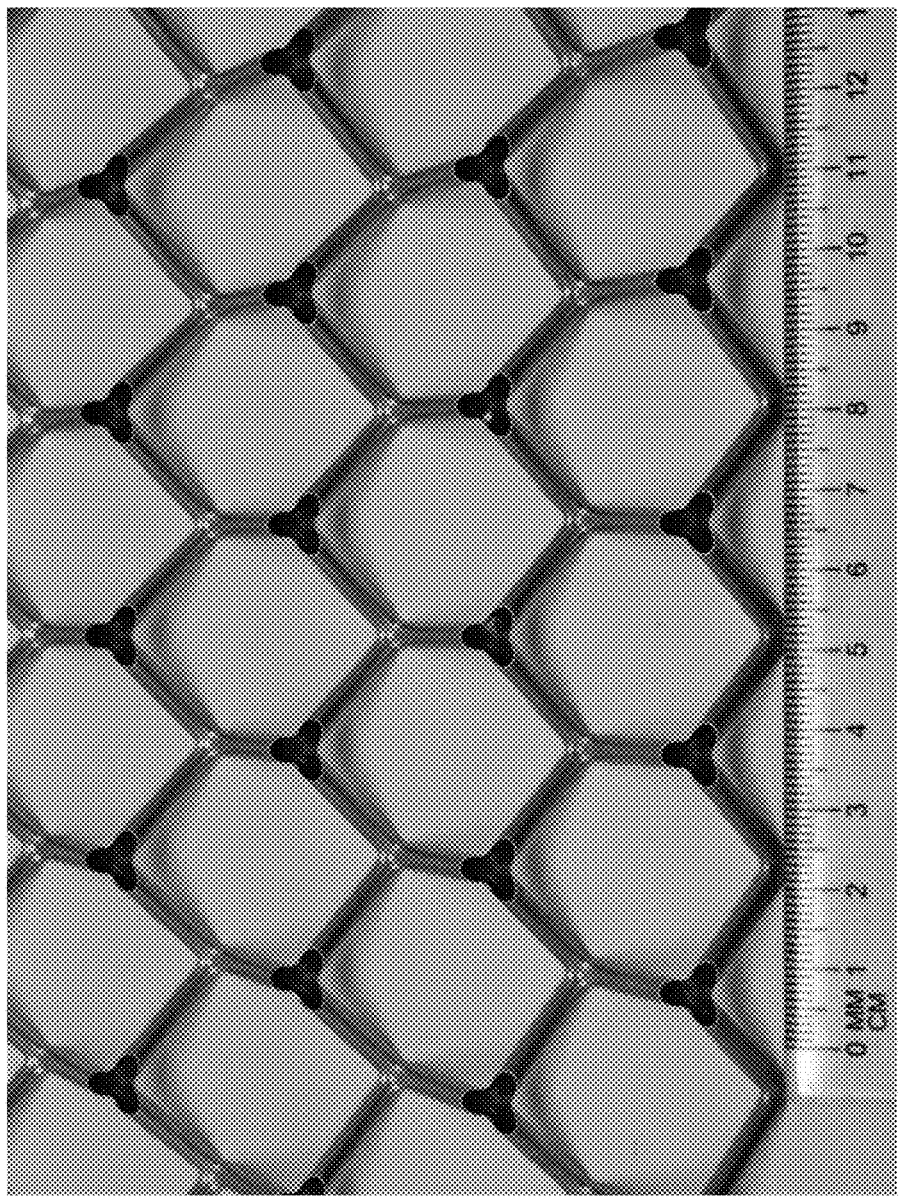
FIG. 3A is a perspective view of a truss core according to an embodiment of the present invention.
Figure 3B:
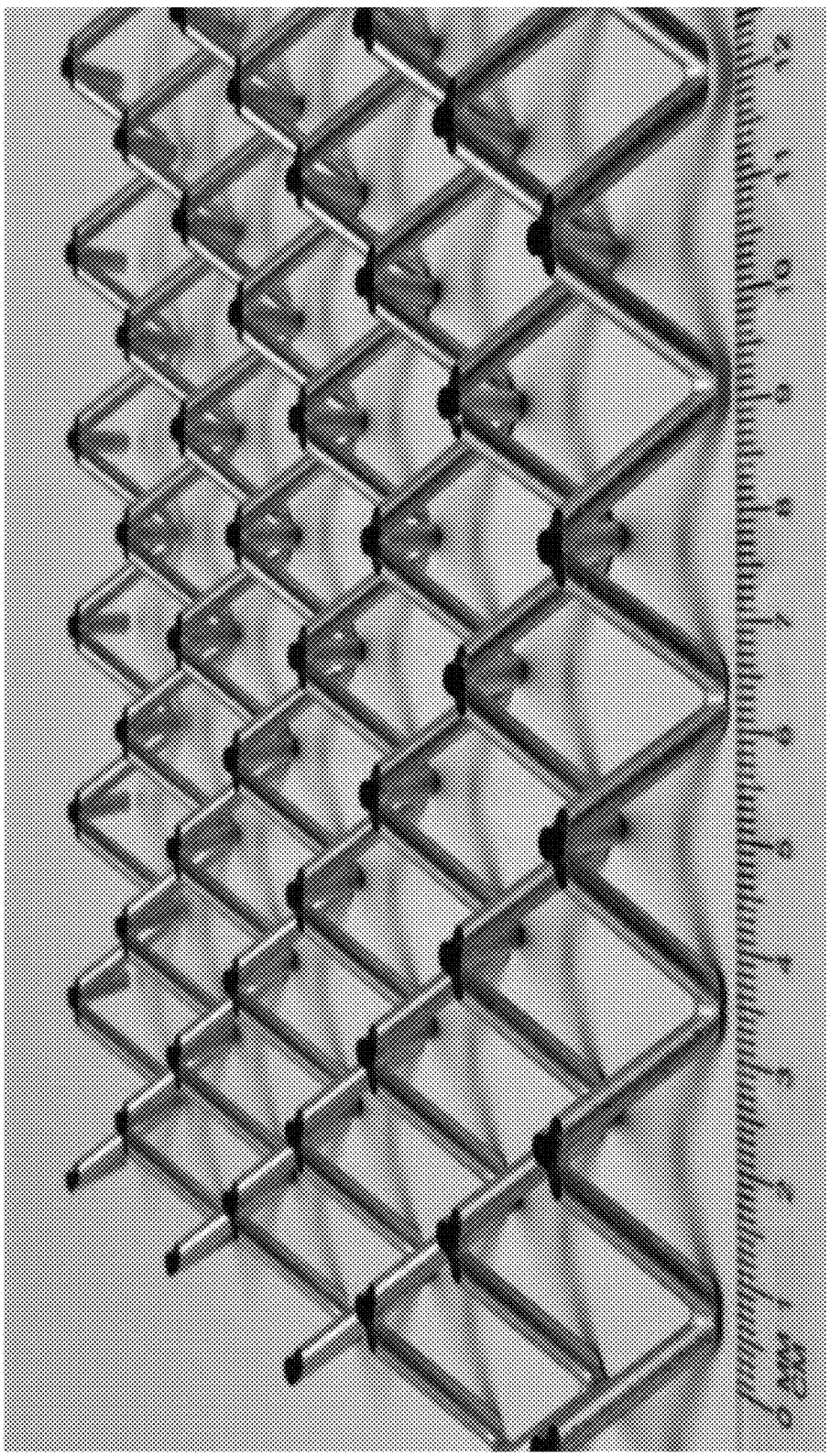
FIG. 3B is an enlarged perspective view of the truss core of FIG. 3A.
Figure 3C:
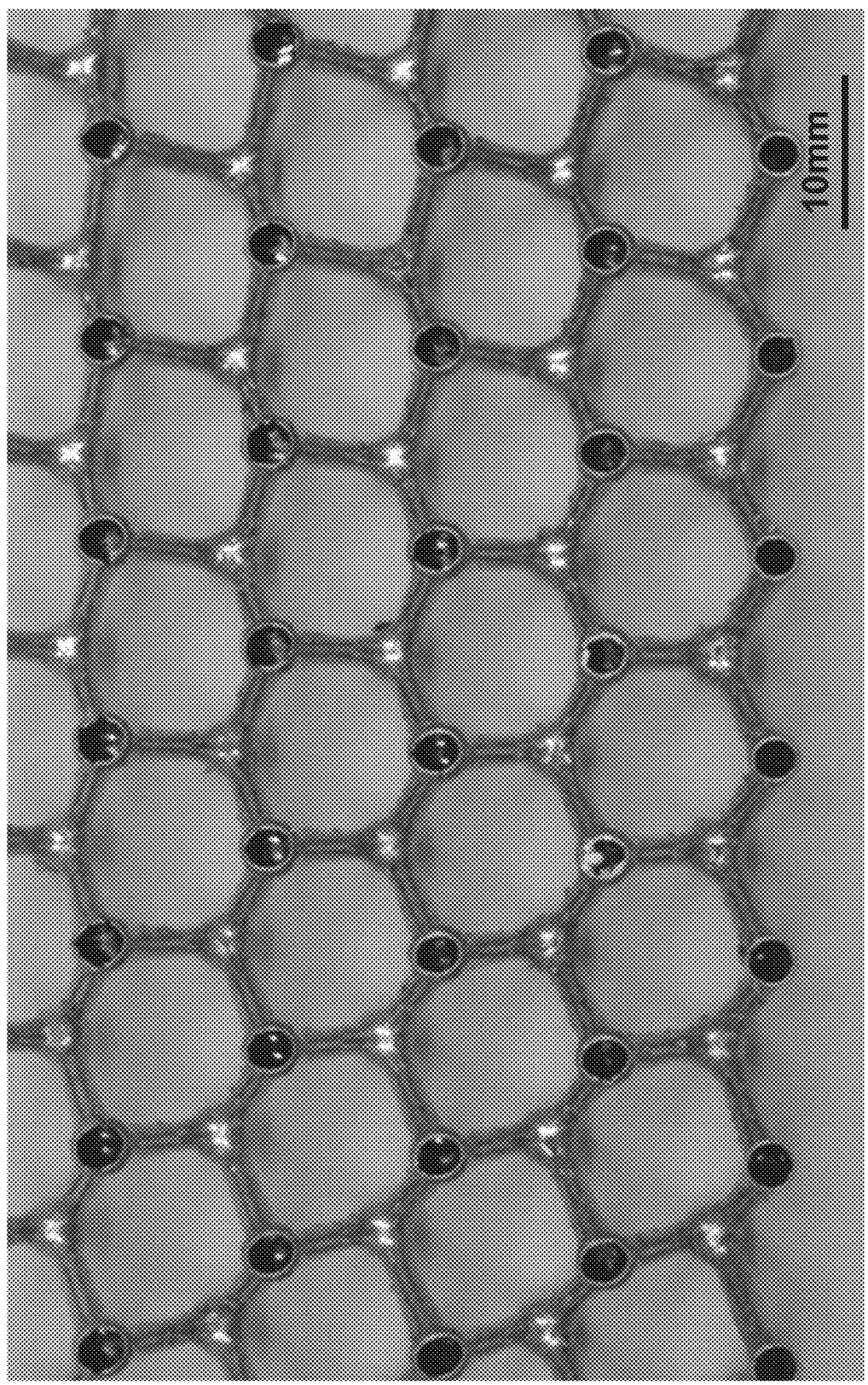
FIG. 3C is a top view of the truss core of FIG. 3A.
Figure 3D:
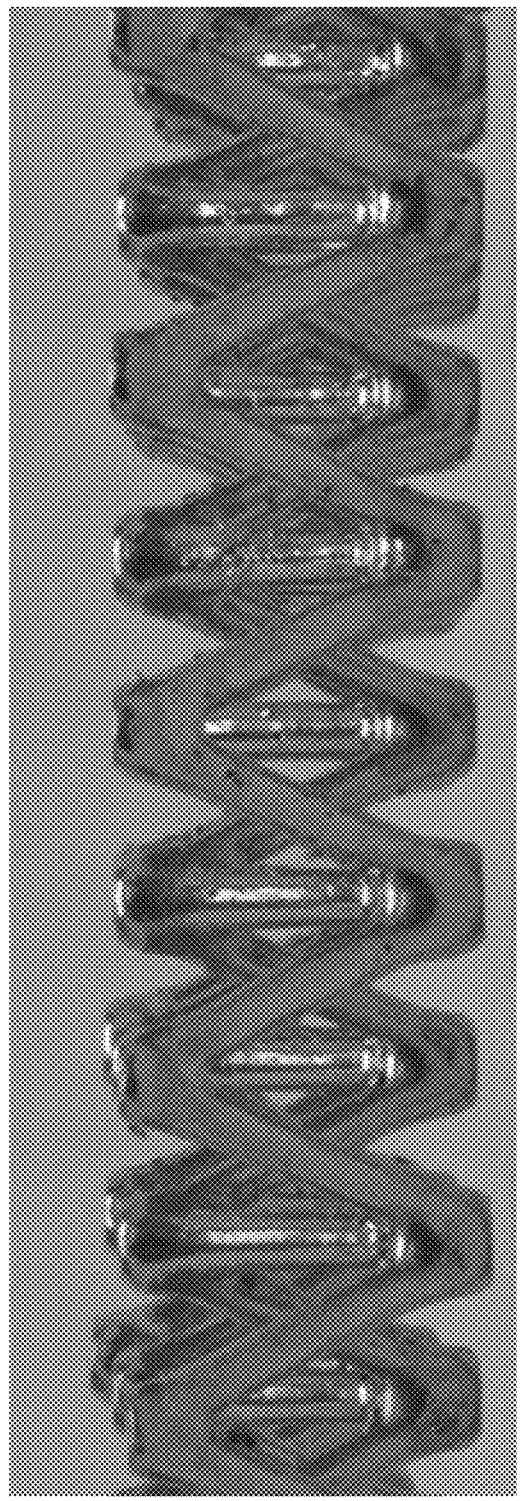
FIG. 3D is a front view of the truss core of FIG. 3A.
Figure 3E:
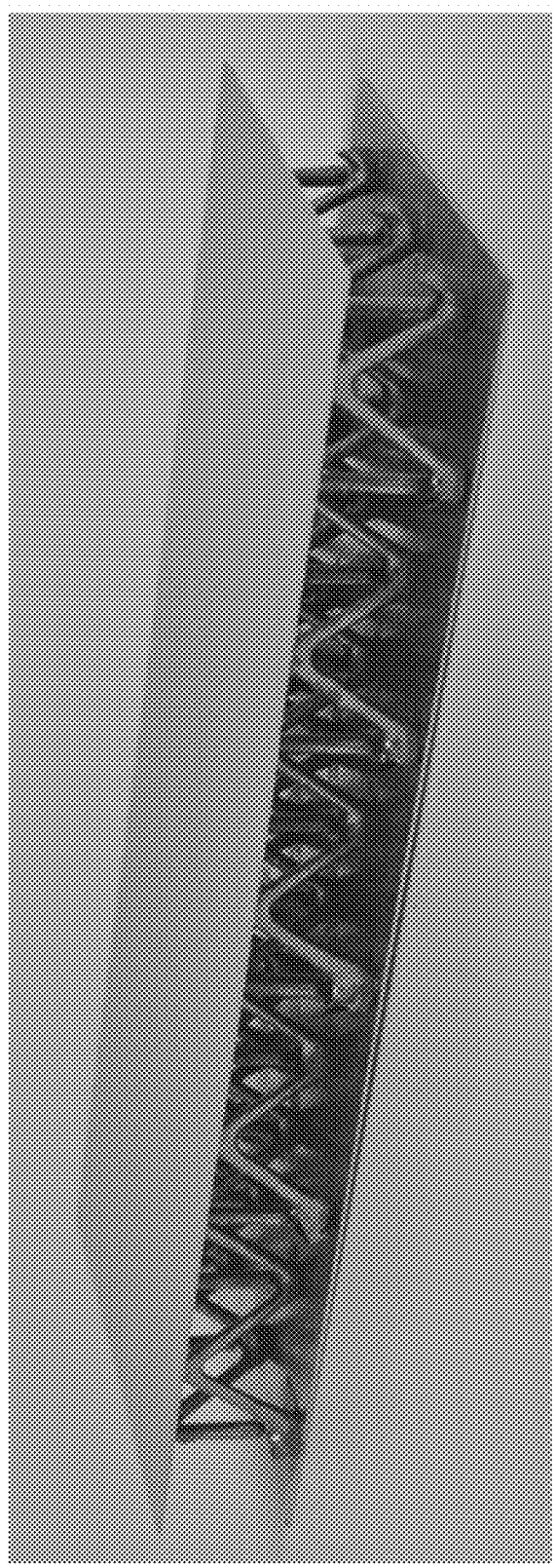
FIG. 3E is a perspective view of a sandwich using the truss core of FIG. 3A.

FIGS. 3A and 3B show two views of a hollow tetrahedral metallic truss core with truncated nodes. FIGS. 3C and 3D show two views of a hollow tetrahedral metallic truss core with standard nodes (no truncation) and a different truss member length and diameter as compared to FIG. 3A. The truss cores were fabricated by making a pyramidal polymer core template using the self-propagating photopolymer waveguide method described above and in the '959 Patent. The core template was coated with a thin Ni—P layer by electroless nickel plating to render it conductive. The nodes at the top and bottom were then sanded to remove the coating and expose the polymer. An approximately (about) 50 micrometer thick nickel layer was added by standard electroplating in a nickel sulfamate bath. The polymer template was then etched away with a 1.5 M NaOH solution to achieve a hollow nickel truss core with a density of approximately 30 kg/m$^3$. The tetrahedral truss core in FIGS. 3A-3D exhibits 3-fold symmetry; three truss members meet at each node. FIG. 3E shows a sandwich made by a adding two facesheets to the core of FIGS. 3A-3D.

Figure 4A:
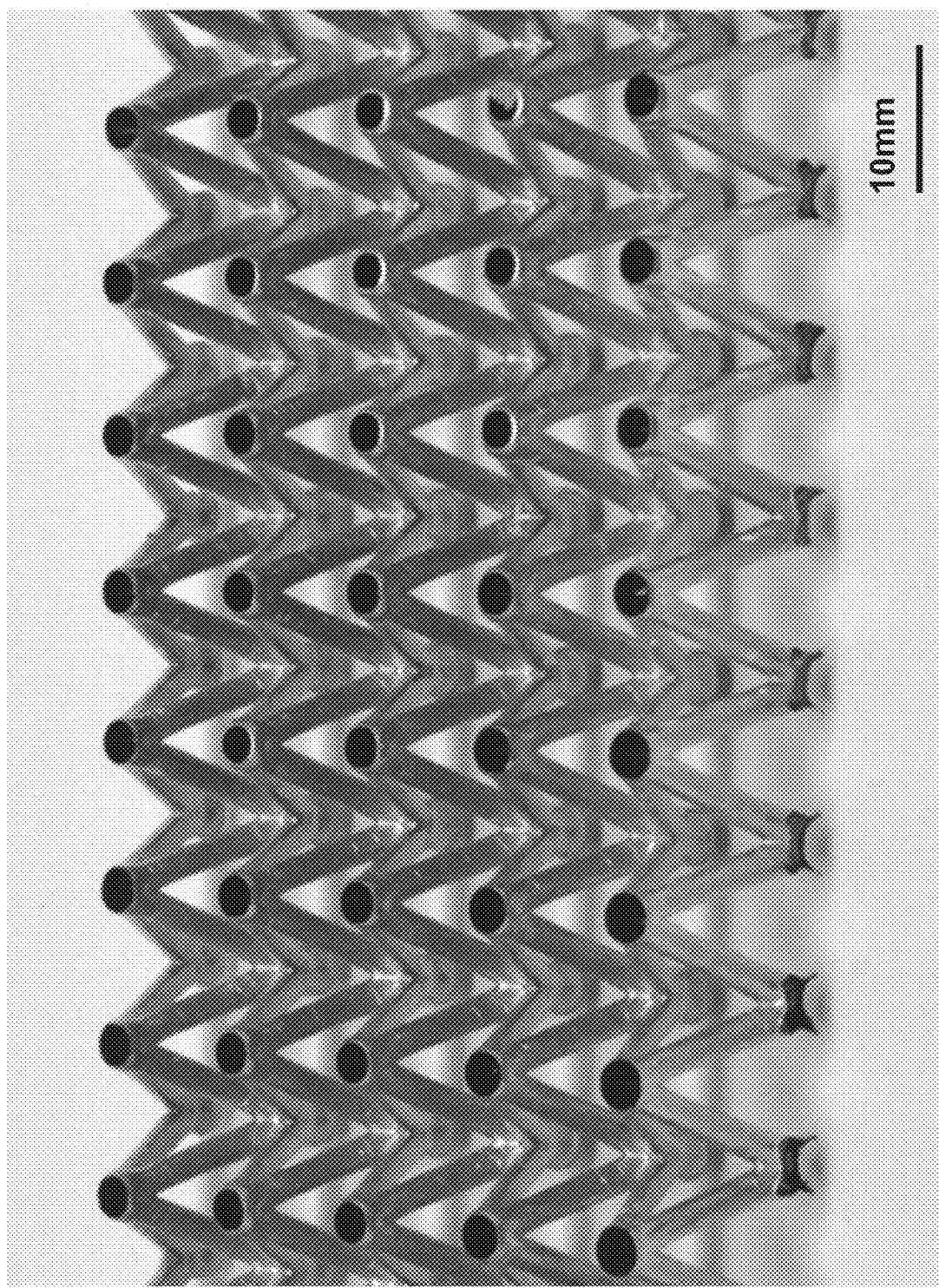
FIG. 4A is a perspective view of a truss core according to another embodiment of the present invention.
Figure 4B:
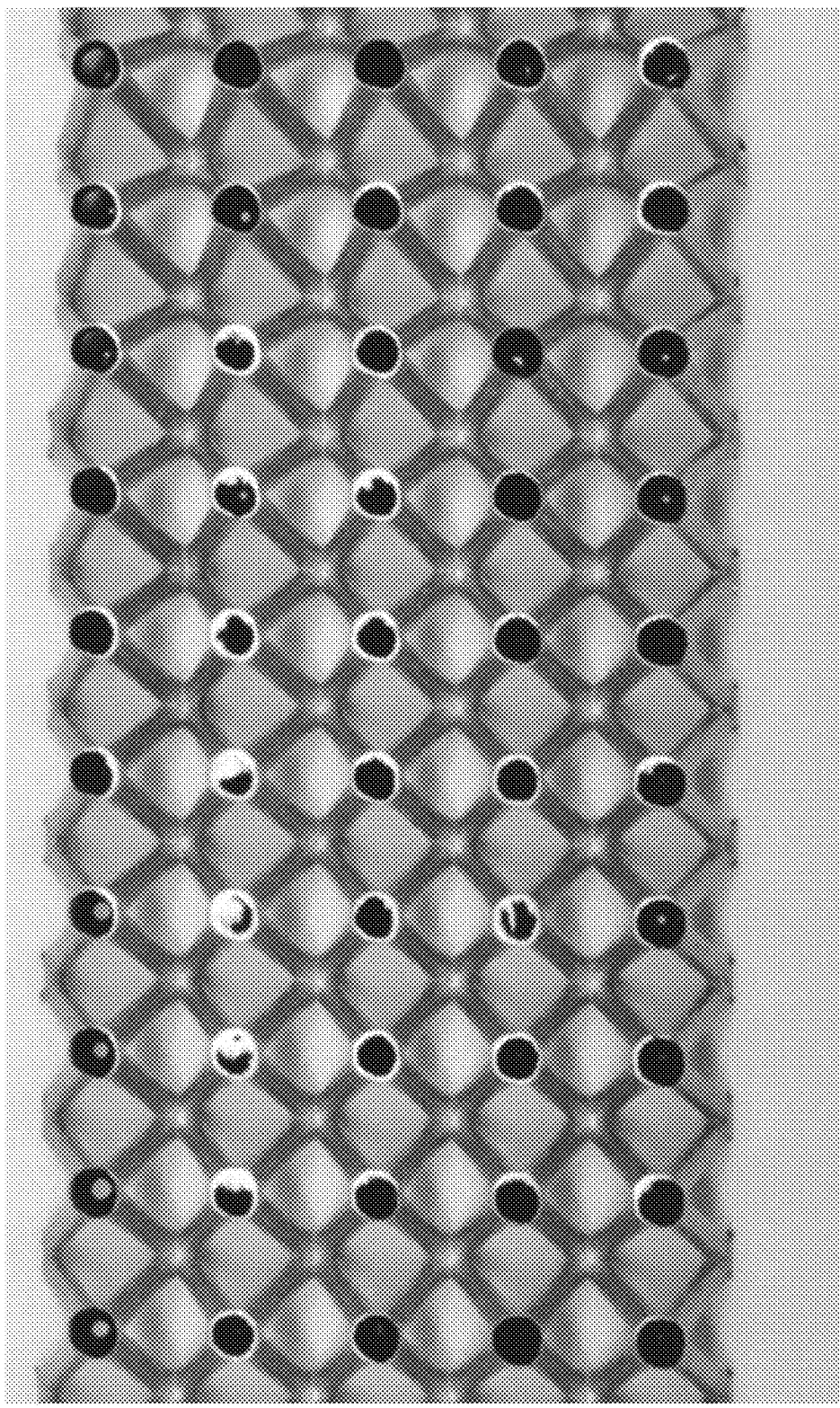
FIG. 4B is a top view of the truss core of FIG. 4A.
Figure 4C:
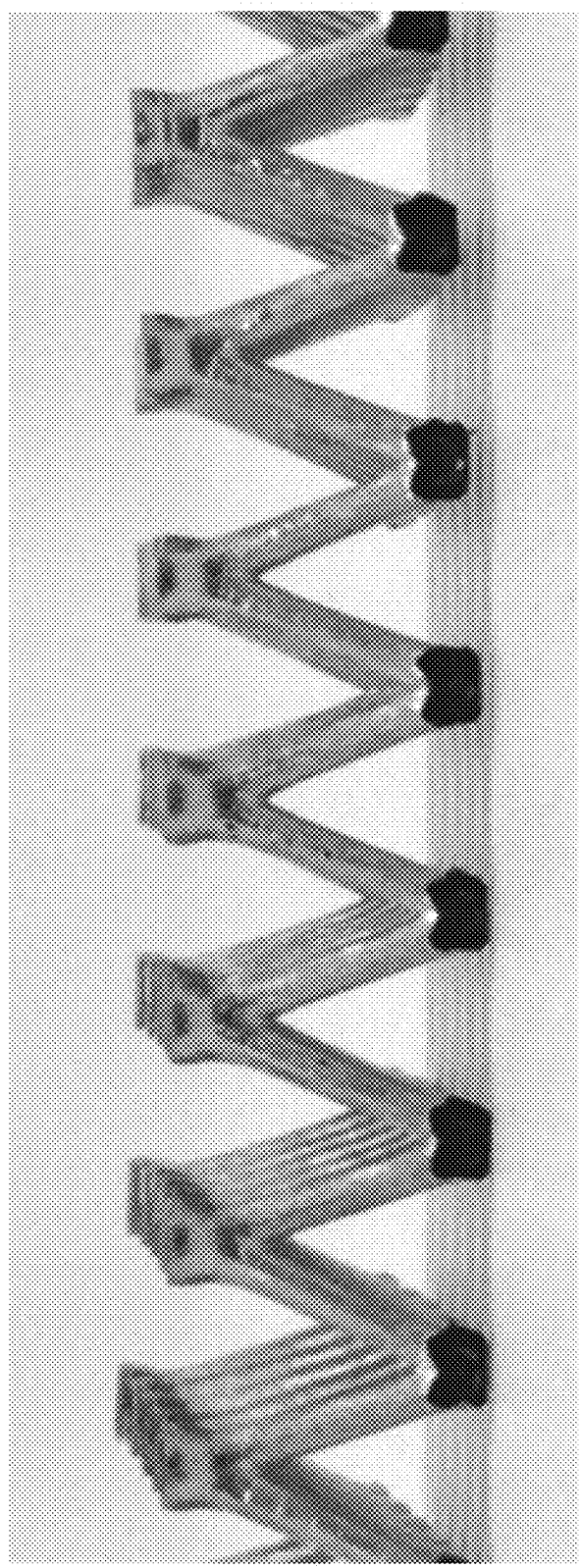
FIG. 4C is a front view of the truss core of FIG. 4A.

FIGS. 4A-4C show three views (perspective view, FIG. 4A, top view, FIG. 4B, and front view, FIG. 4C) of a pyramidal truss core with 4-fold symmetry, in which four struts meet at each node. While a structure with 3-fold symmetry (e.g., the structure of FIGS. 3A-3D) may make more uniform coating coverage possible, around the nodes and especially under the nodes, the 4-fold symmetry of the structure of FIGS. 4A-4C may provide greater shear stiffness and strength in a specific direction. The core architecture for both embodiments (that of FIGS. 3A-3D and that of FIGS. 4A-4C) is referred to as pyramidal, since the hollow truss members lie along the edges of imaginary pyramids with 3 or 4 sides and do not cross over to form a full lattice with unconstrained nodes.

Figure 5A:
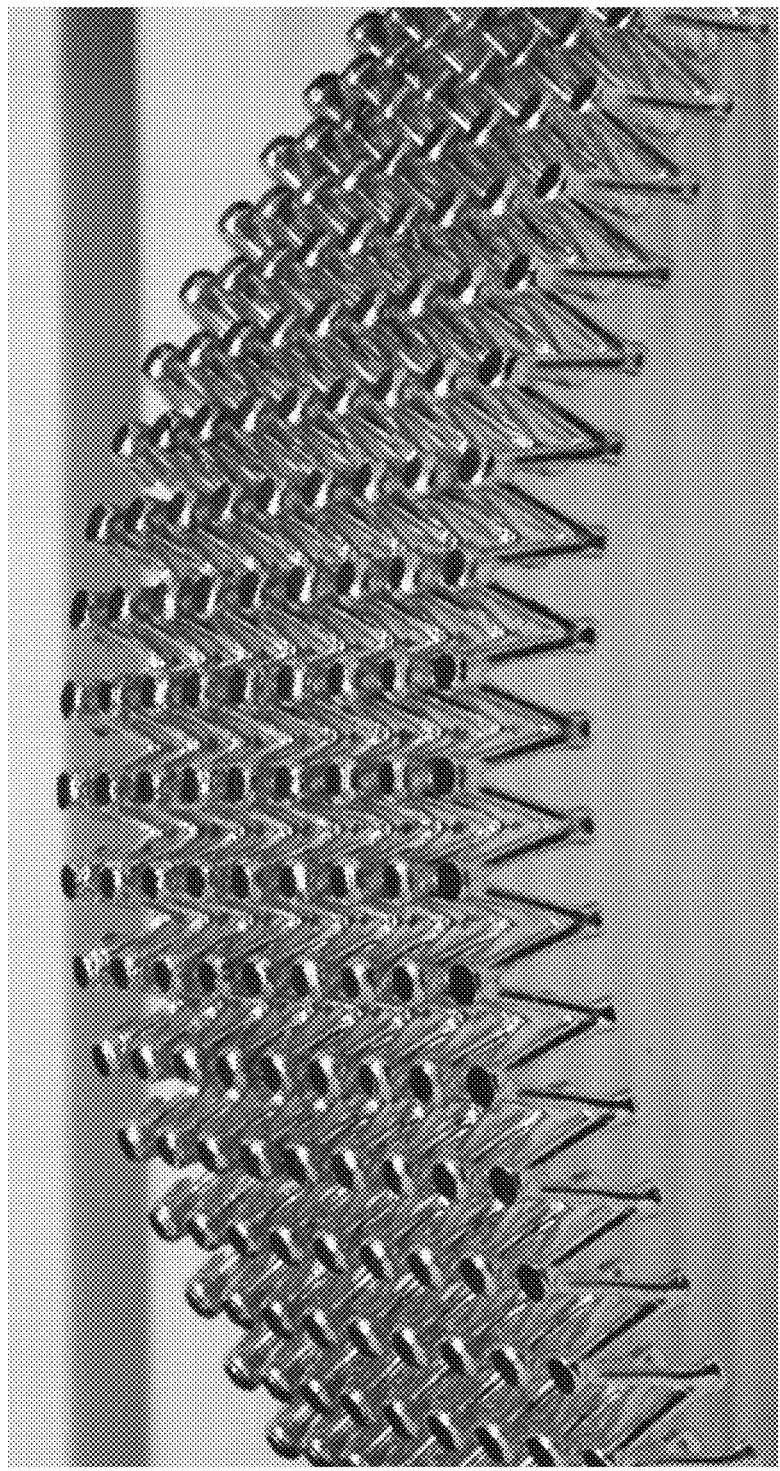
FIG. 5A is a perspective view of a curved truss core according to another embodiment of the present invention.
Figure 5B:
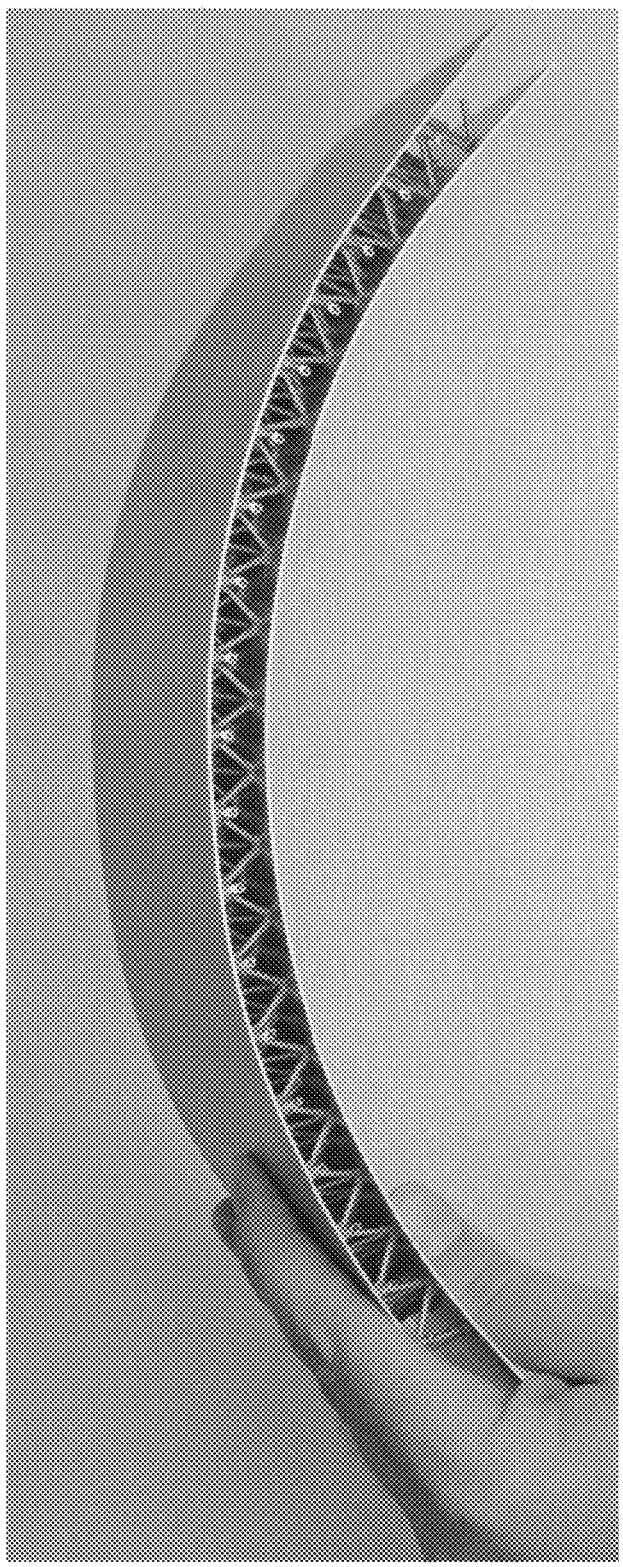
FIG. 5B is a perspective view of a sandwich using the truss core of FIG. 5A.
Figure 5C:
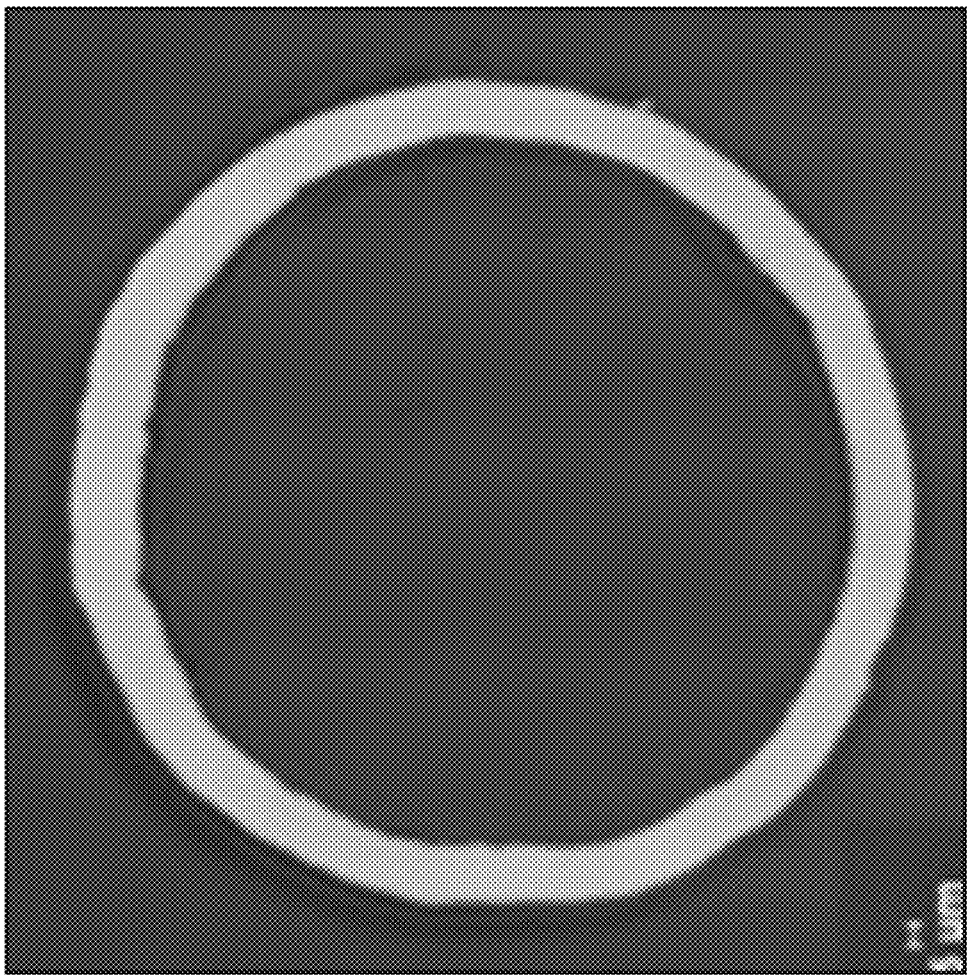
FIG. 5C is a photomicrograph of a cross section of a truss member of the truss core of FIG. 5A.

FIG. 5A shows a curved truss core. This core was fabricated curved, by curving the polymer template via heating it above the glass transition temperature of the polymer, bending it, and cooling it to fix the curvature. The curved polymer template was then coated with nickel by electroplating. Face sheets were subsequently bonded to the core with epoxy adhesive, to form the curved sandwich structure of FIG. 5B. FIG. 5C shows a cross section of a truss member of the embodiment of FIGS. 5A and 5B. In other embodiments, hollow metallic pyramidal truss cores can be bent to assume a curvature, since the pyramidal architecture may be capable of being bent into a curved shape without being damaged.

The openness of a pyramidal truss core template may enable fairly uniform coating, even with methods that are not entirely non-line-of-sight, such as electroplating and physical vapor deposition. When electroplating is used, the electroplating process parameters may be adjusted to maximize the throwing power, so that every part of the surface will be coated and the overall coating thickness may be reasonably uniform. The coating may be thicker at the locations that extend towards the electrodes and are not shielded from the flow of metal ions, which in the case of flat pyramidal cores may be the nodes. A thicker coating at the nodes may increase strength, since the nodes may concentrate stresses. Good coating coverage and thickness uniformity may be achieved using electron beam evaporation and sputtering using a rotary, 3-dome planetary fixture to continuously change the truss core's angle with respect to the evaporant stream, and flipping the core over halfway through the deposition. In another embodiment, direct current (DC) bias field cathodic arc physical vapor deposition is used to apply a metal coating; in this method a voltage bias applied to the structure improves non-line-of-sight deposition by attracting metal ions and charged particles. This method also allows deposition of thicker coatings (e.g. 50 microns thick in 2 hours).

Figure 9:
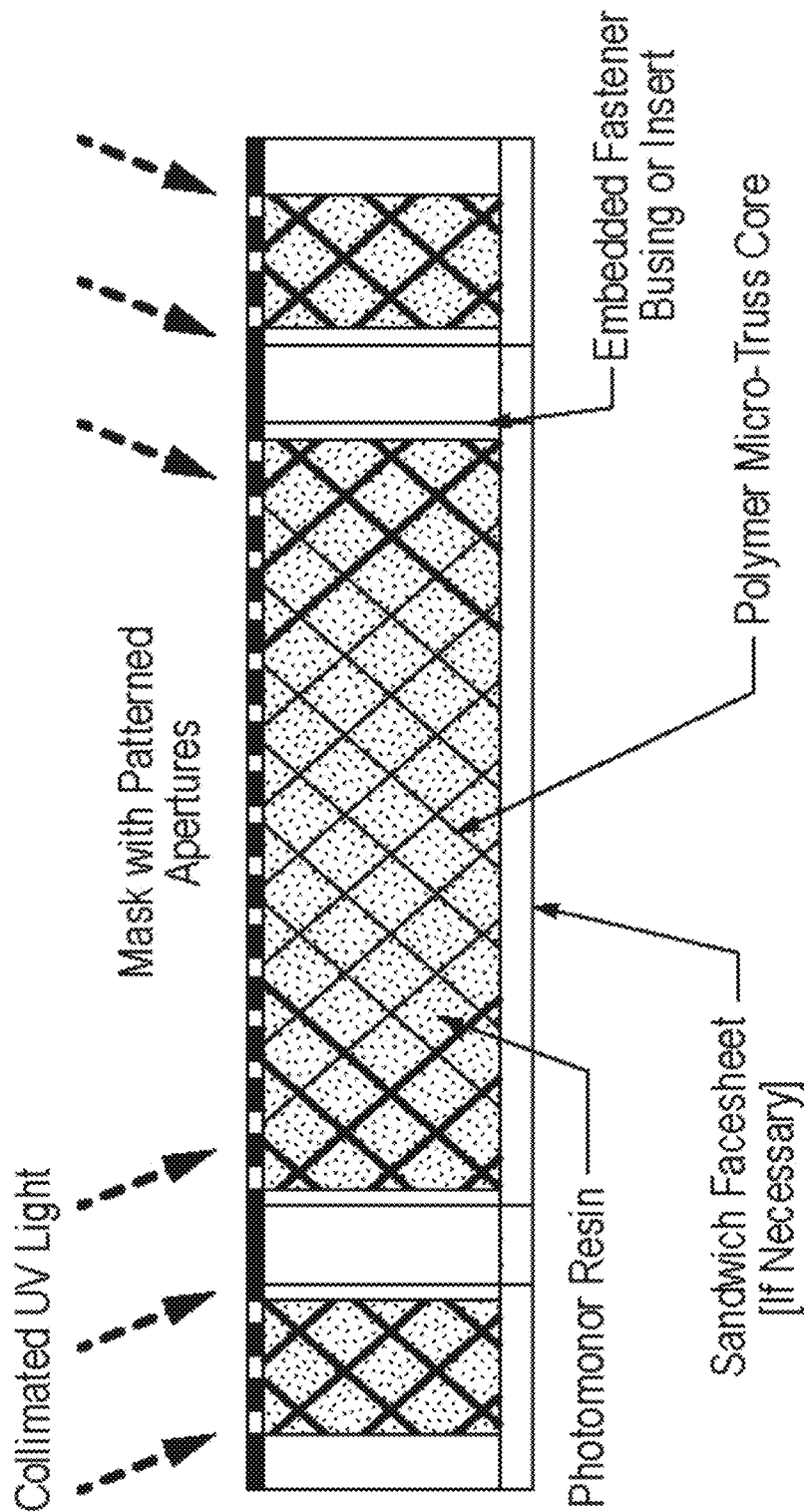

Beyond the pyramidal truss core, other core architectures, e.g., truss cores with oval, rectangular or irregular shaped struts, may also be coated as described above. The truss members may intersect at unconstrained nodes in the interior, forming a structure with multiple unit cells through the thickness as shown in FIG. 9. In some embodiments, the core template is fabricated by three-dimensional (3D) printing; in this case other features, such as a post, a wall or an odd shaped feature connecting the two facesheets can be added, as well as separation walls to separate areas from each other. The more line-of-sight limited the coating method is, the more difficult it may be to achieve uniform coating thickness on cores where regions in the interior are in the shade of outer features. Coating processes like electroless plating, atomic layer deposition, chemical vapor infiltration and chemical vapor deposition may however have the ability to deposit structures with multiple unit cells through the thickness, such as the structure of FIG. 9.

Figure 6:
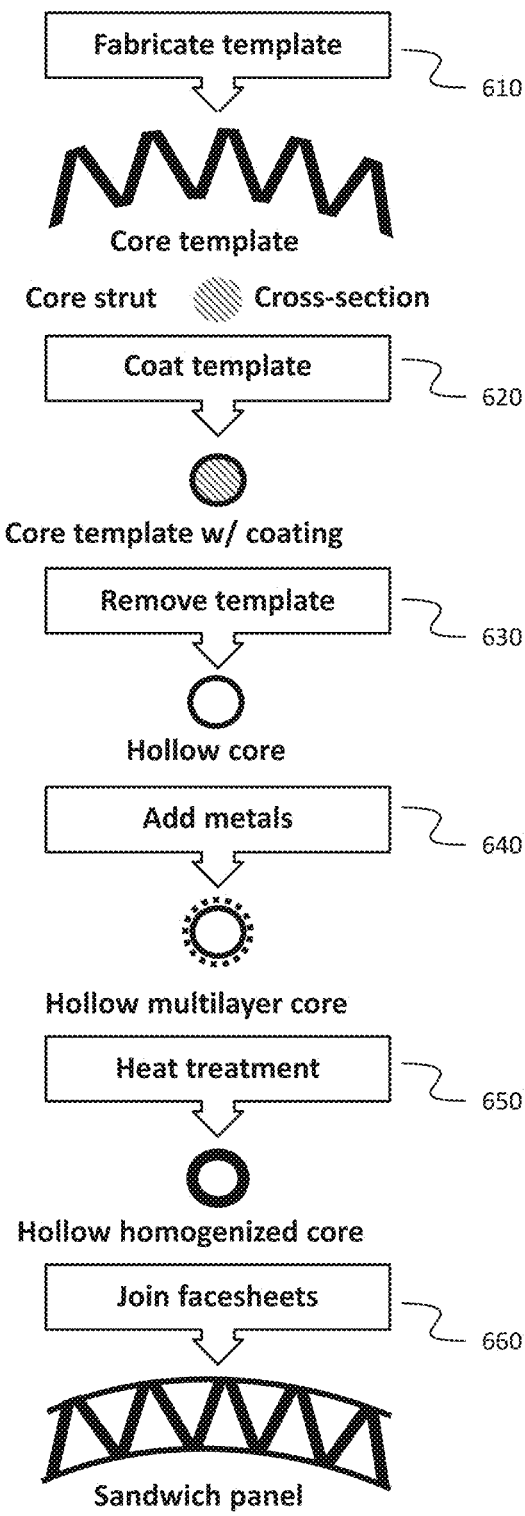

FIG. 6 shows a flow chart of a method, according to one embodiment, to fabricate a curved high temperature alloy sandwich panel with a truss core. In an act 610, a core template is fabricated, e.g., out of polymer material by additive manufacturing, for example by 3D printing, by stereolithography or by a self-propagating photopolymer waveguide method such as that taught by the '959 patent. Alternatively the template may be fabricated from any other material that lends itself to being coated. The core may be fabricated in a complex, curved shape or may be fabricated as a flat sheet and shaped afterwards. A thermoset polymer core template may be shaped to a certain curvature by heating the polymer above the glass transition temperature, shaping it and then cooling it to make the change in shape permanent.

In an act 620, the template is coated, and in an optional act 630 the template is removed with a base etch, acid etch, plasma etch or solvent bath. The coating may be strong enough to survive free-standing and the coating may be compatible with the process used to remove the template. The template may be coated by electroplating, electroless plating, chemical vapor deposition, physical vapor deposition, slurry coating, dip coating, or another method. To enable electroplating, the polymer template may first be rendered conductive by depositing a thin nickel, chromium, cobalt, or other metal layer by physical vapor deposition, electron beam evaporation, sputtering, or electroless plating. In one embodiment, the first coating is a relatively thick layer of electroplated nickel, cobalt or copper, and the template is then removed by a base etch, e.g., an etch with 1.5M NaOH.

The act 630 of removing the template is optional. A hollow core structure may have lower density, but in cases where density is not critical, the template may be left in the core. Leaving the template in the core will suppress local buckling of the hollow struts, which can increase specific strength in some cases, especially if the core contains multiple layers of cells and unconstrained nodes.

In an act 640, additional chemical elements are added. This step is optional, and in some embodiments, the additional elements are added before the removal of the core template. The additional elements may be added with controlled thicknesses to achieve the volume or weight fraction corresponding to an alloy formed in an act 650.

A heat treatment is then performed, in act 650, to interdiffuse the different coating layers and achieve a homogenized alloy. The temperature of the heat treatment is chosen to achieve timely equilibration of the coating. Intermittent heat treatments can be performed to promote interdiffusion before adding additional elements. In one embodiment the heat treatment includes heating the hollow truss core to 1200° C. for 24 hours. After the act 650 of heat treating the hollow truss core, the separately deposited layers of metals or other elements may be interdiffused to the extent that they form one continuous layer. As used herein, a continuous layer is a layer which the concentration of each elemental component of the layer is continuous throughout the layer, i.e., does not change discontinuously at any point within the layer. In several stacked layers with different compositions, by contrast, the concentrations of one or more elemental components may change discontinuously at inter-layer boundaries. In one embodiment, the concentration of each element of the continuous layer (i.e., the layer formed during the act 650 of heat treating the hollow truss core) varies by less than 5% within the continuous layer. In one embodiment, the continuous layer formed by the act 650 of heat treating the hollow truss core contains, as a major component, an element selected from the group consisting of nickel, cobalt, refractory elements, and combinations thereof. As used herein, the term "refractory element" includes niobium, molybdenum, tantalum, tungsten, rhenium, titanium, vanadium, chromium, zirconium, hafnium, ruthenium, osmium, and iridium.

After the core is fabricated, face sheets may be attached, in an act 660, by brazing, diffusion bonding, transient liquid phase diffusion bonding, solid state welding, resistance welding, or electrojoining. In one embodiment a facesheet contains, as a major component, an element selected from the group consisting of nickel, cobalt, refractory elements, and combinations thereof.

FIGS. 7A-7D show four different possible coating stacks for different core alloys. FIG. 7A shows coatings that may be deposited for a nickel or cobalt based superalloy. In one embodiment, the polymer template is rendered conductive by depositing a thin layer (0.1-1 micron) of nickel or cobalt by electron beam evaporation. This deposition technique may be used instead of electroless nickel plating because electroless nickel plating may introduce phosphorous. To introduce small amounts of Mo, W, Ta, Ti, Re, Si, C, B, Zr, Hf, and/or Y into the targeted alloy, these elements may be deposited in the appropriate thickness first and then capped with 100 nm layer of nickel or cobalt to facilitate plating of the subsequent layer or layers. Subsequently standard electroplating may be used to build up a relatively thick layer of nickel or cobalt. Then layers of chromium and aluminum with a thickness needed to achieve the target alloy composition are added by pack cementation, chemical vapor deposition (CVD) or electroplating, e.g., to a thickness between 10% and 40% of the thickness of the nickel or cobalt layer. If desired, optional elements like Mo, W, Ta, Ti and/or Re can be added with a thickness between 1% and 15% of the thickness of the nickel or cobalt layer. Trace elements, e.g., Si, C, B, Zr, Hf, and/or Y can also be added by physical vapor deposition (PVD) or CVD.

FIGS. 7B and 7C show coatings that may be deposited to fabricate a core out of a high temperature cobalt-rhenium based alloy. Cobalt and rhenium can be co-deposited by electroplating using cobalt sulfate and potassium perrhenate forming a base coating that has higher temperature capability than nickel or cobalt. Layers of chromium and other alloying elements may then be added.

FIG. 7D shows the coating stack if making a core out of a complex alloy using DC bias field cathodic arc physical vapor deposition (CA PVD). A conductive, robust metal coating may be applied to the polymer template first, typically nickel, cobalt, iron or copper by electroplating. Then a complex alloy can be deposited by CA PVD, for example C-103, which is 89% Nb, 10% Hf and 1% Ti, or C-129Y (10% tungsten, 10% hafnium, 0.1% yttrium, balance niobium), or almost any other complex alloy. CA PVD is a versatile process that allows deposition of many alloys. The first coating can be left in place, interdiffused with the second layer, or etched out, e.g., Cu may be etched out with HNO3.

Figure 8:
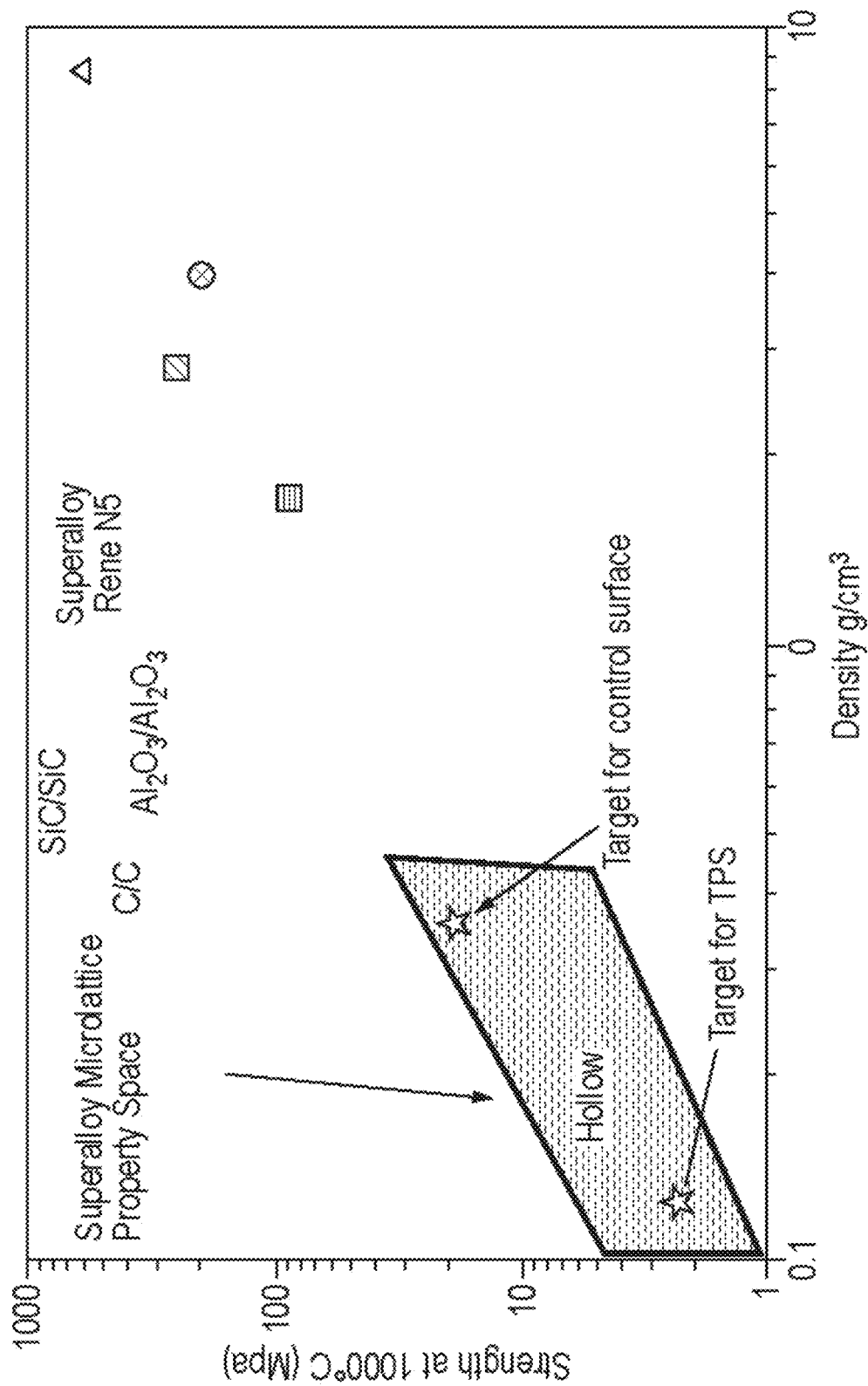

FIG. 8 shows the calculated high temperature strength and density of nickel superalloy truss core sandwich panel cores in comparison to state of the art high temperature materials. It can be seen that such nickel superalloy cores achieve very low densities while maintaining good strength.

Figure 10:
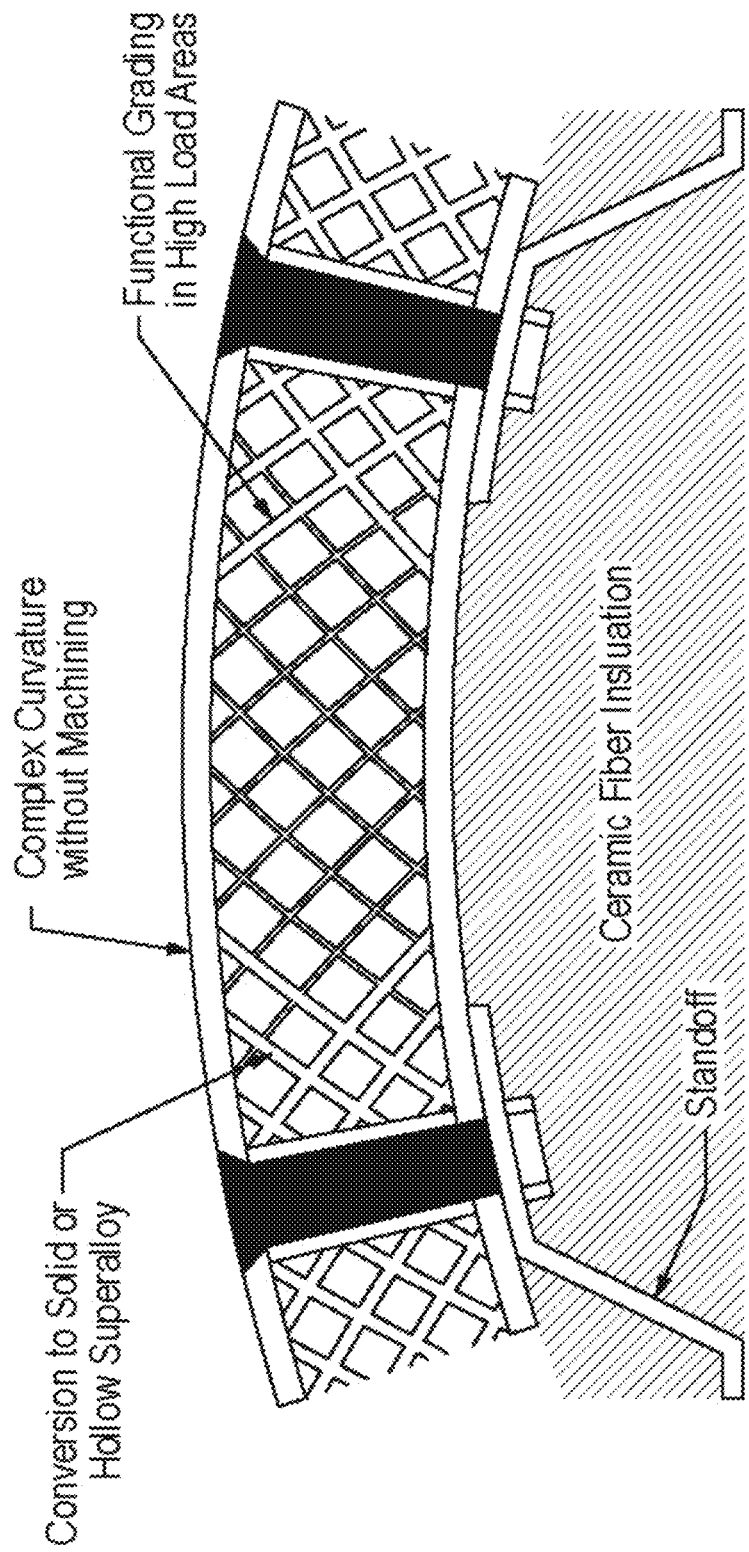

FIGS. 9 and 10 relate to a curved high temperature alloy sandwich panel with a truss core for application in an acreage thermal protection system according to one embodiment. FIG. 9 shows a schematic of the fabrication of a micro-truss core with embedded features such as fasteners, bushings or inserts using a self-propagating photopolymer waveguide method (e.g., the method of the '959 patent). These features are embedded in photomonomer resin and then the resin is exposed through a mask with patterned apertures. Under each aperture a polymer waveguide forms. The mask pattern can be graded to form stronger and denser micro-truss around the fasteners or in areas where strength is needed. After exposure the remaining liquid resin is washed out and the polymer template including the fasteners is processed, e.g., according to acts 620-660 of the method of FIG. 6. To achieve the curvature shown in FIG. 10, the panel may for example be bent in the polymer stage.

Figure 16:
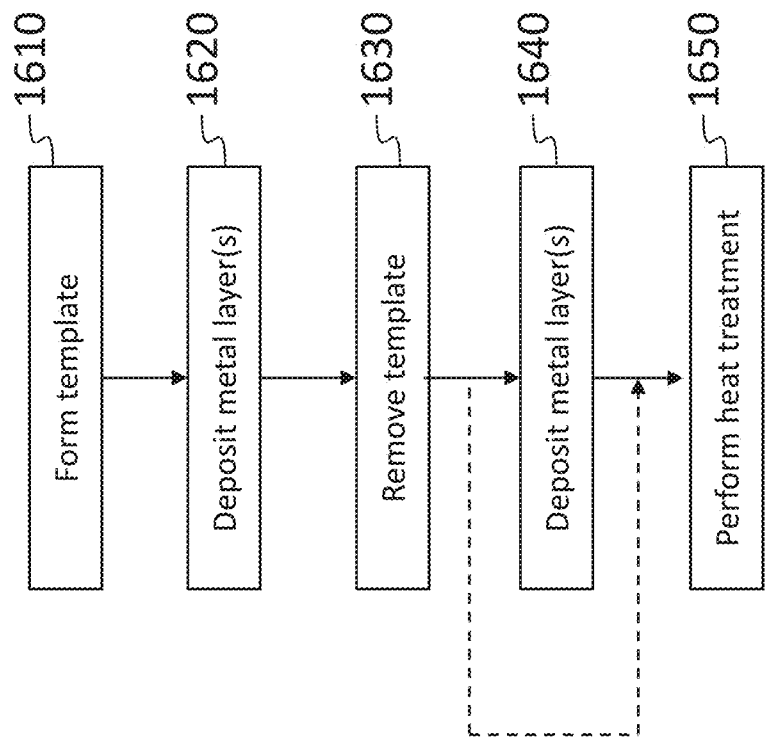

Referring to FIG. 16, in some embodiments, a thin walled structure is formed by, in an act 1610, forming a template (e.g., a polymer template), coating the template, in an act 1620, with one or more layers of one or more metals, removing the template, in an act 1630, to form a first thin metal structure, coating the first thin metal structure, in an act 1640, with one or more layers of one or more metals, and performing a heat treatment, in an act 1650. In some embodiments the second act 1640, of adding one or more layers of one or more metals, may be omitted.

Figure 17:
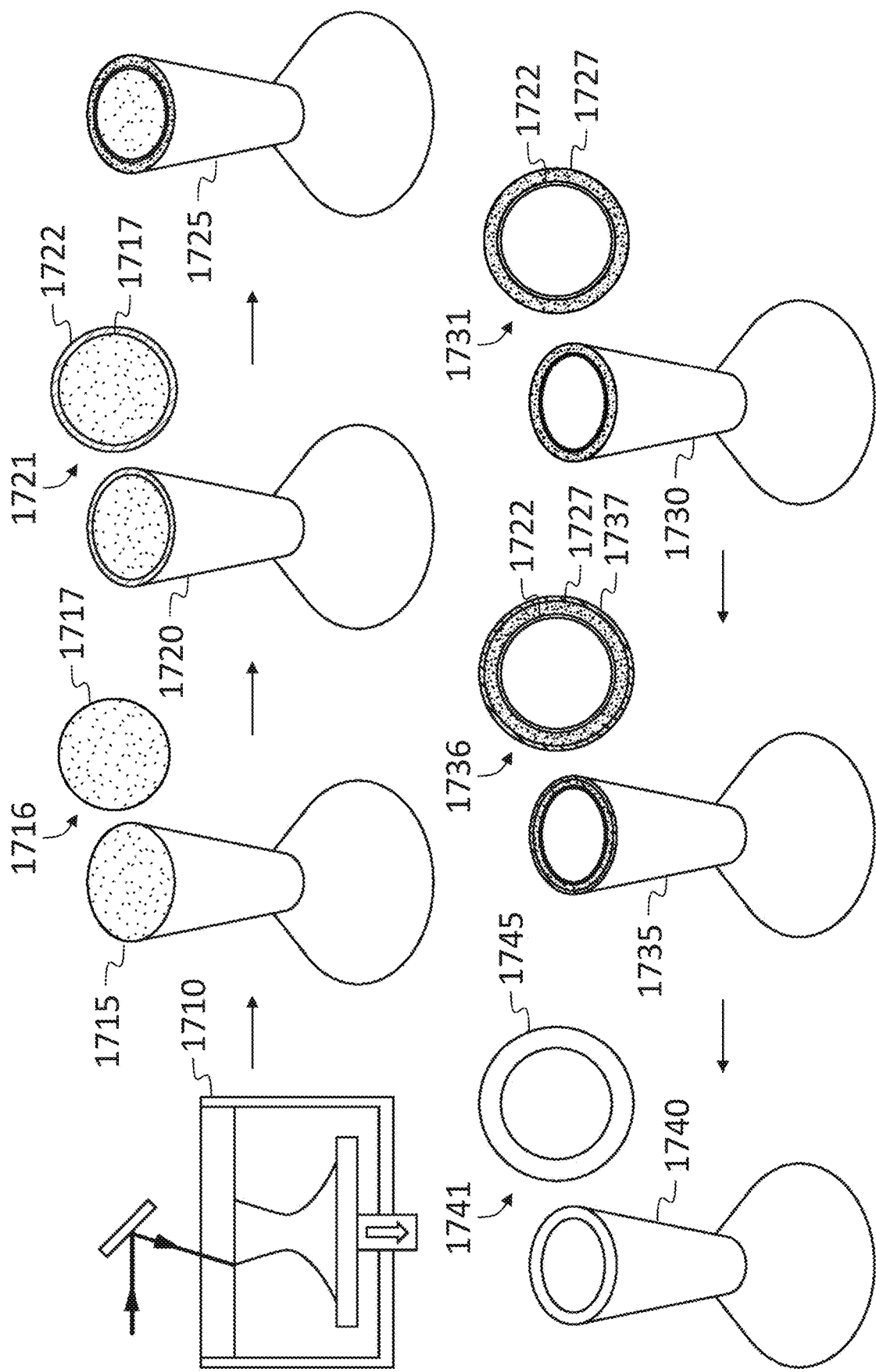

FIG. 17 is an illustrated process diagram illustrating an embodiment according to the process of FIG. 16. As mentioned above, in an act 1610 (FIG. 16), a positive polymer template 1715 is produced, on which to deposit the thin walled structure. The positive polymer template 1715 has a substantially uniform polymer core 1717 as shown in the cross section 1716. The positive polymer template 1715 may be produced, for example, utilizing an additive polymer process, such as stereolithography (SLA) (as illustrated in FIG. 17), micro-extrusion, PolyJet™ printing, fused deposition modeling (FDM), and/or (as mentioned above and illustrated in FIG. 1) photopolymer waveguide processing. In an act 1620 (FIG. 16), one or more metal layers are then deposited on the positive polymer template 1715. The positive polymer template 1715 may first be rendered conductive (to make a subsequent electrodeposition process possible), to form a conductor-coated template 1720, having a cross section 1721 including a thin (e.g., 1 µm thick) conductive (e.g., metal) layer on the substantially uniform polymer core 1717. The coating may be performed, e.g., by depositing a metal layer, having a thickness of approximately 1 µm, by electroless plating or electron beam evaporation. Electron beam evaporation may be used, to ensure the purity of the metals deposited. Electroless nickel deposition is another technique that may be employed, but these deposits contain 4-8 wt % phosphorous, which may be detrimental to the target alloys. Good coating coverage and thickness uniformity during electron beam evaporation may be achieved by using a rotary, 3-dome planetary fixture to continuously change the part's angle with respect to the evaporant stream, and flipping the part over halfway through the deposition. A 1 µm thick Ti layer may be deposited, for example, and capped with 100 nm of Pt to avoid surface oxide formation and facilitate subsequent electrodeposition. Before electroplating, the underlying polymer may be exposed in certain areas, e.g., by sanding off the thin metal coating, allowing access for chemical removal of the polymer at a later stage. With the rest of the surface of the part still covered by a conductive Ti/Pt layer, a power supply may be connected via multiple wires to carry out electrodeposition.

Once the positive polymer template 1715 has been rendered conductive, electrodeposition may be employed to form further metal layer(s), because of this technique's compatibility with a polymer template (e.g., being capable of being performed at relatively low temperatures, that the positive polymer template 1715 may withstand) and ability to deposit dense and smooth metal coatings in the thickness range of 10 µm to 100 µm in a rapid and cost-efficient manner.

Electrodeposition of nickel, for example, may be conducted in a commercial nickel sulfamate bath (available from MacDermid Barrett) at a low current density of 50 mA/cm$^2$ resulting in a deposition rate of 60 µm/hour. The orientation of the part with respect to the anodes may be changed regularly to ensure deposition of a uniform coating. Custom anodes may be designed to cover hard to reach areas. Electrodeposition of copper may be carried out in a commercial copper sulfate bath (e.g., Technic Elevate 40) at current densities of 20 mA/cm$^2$-50 mA/cm$^2$ resulting in a deposition rate of 25 µm/hour to 65 µm/hour. Cobalt may be deposited by electroplating in an aqueous solution of $CoSO_4$, NaCl and citric acid at room temperature. A current density of 10 mA/cm$^2$ may be used, resulting in a deposition rate of 10 µm/hour.

The following process may be employed to co-deposit rhenium with cobalt by electroplating in an aqueous solution of cobalt sulfate and potassium perrhenate. Deposition may be performed at 65° C. and 50 mA/cm$^2$ resulting in a deposition rate of 30 µm/hour. A pH of 7 may be maintained throughout the deposition with periodic additions of ammonium hydroxide. Dual platinum coated titanium mesh anodes may be used to improve the current distribution on the part. Plating may be performed using a high level of agitation at the cathode to enable high mass transfer at the plating surface and to remove bubbles from the surface due to gas evolution, which otherwise may leave gas marks in cobalt and/or cobalt alloy deposition. Smooth deposits with thicknesses over 50 µm may be achieved, with a composition of 80 wt % Re and 20 wt % Co as measured by electron dispersive X-ray analysis.

After electrodeposition, the intermediate product may be a metal-coated template 1725. Once the metal coatings exhibit sufficient structural rigidity, the polymer template can be removed, in an act 1630 (FIG. 16), by chemical etching or solvent washout, depending on the type of polymer used, resulting in a first hollow multi-layer structure 1730 having a cross section 1731 including a thin (e.g., 1 µm thick) inner conductive (e.g., metal) layer 1722, and a thicker (e.g., 50 µm thick) outer metal layer 1727. To remove the positive polymer template 1715, the positive polymer template 1715 may be accessed (by a polymer removal fluid such as a solvent or etchant) via sufficient areas that are not coated or where the coating is removed. Polymer removal may be accomplished, for example, by soaking parts overnight in an aqueous 1.5M NaOH solution at a temperature of 60° C. The parts may then be rinsed multiple times to remove any NaOH and polymer residue, and dried.

After the polymer is removed by etching or solvent wash out, higher temperature depositions processes may be employed in an act 1640 (FIG. 16) to apply one or more additional layers of metals, to form a second hollow multi-layer structure 1735 having a cross section 1736, which includes a thin (e.g., 1 µm thick) inner conductive (e.g., metal) layer 1722, a thicker (e.g., 50 µm thick) intermediate metal layer 1727, and a third (e.g., 20 µm thick) outer metal layer 1737. The positive polymer template 1715 being absent during these deposition process, the deposition processes need not be ones that are capable of being performed at relatively low temperature. Chemical vapor deposition processes, which exist for a range of metals, may be employed. Various other deposition processes, such as low-cost pack cementation, vapor phase diffusion coating processes, sputtering, and/or cathodic arc deposition, may also be employed.

Chromium may be deposited, for example, by pack cementation following standard number ASTM B874 promulgated by ASTM International (formerly the American Society for Testing and Materials). The second hollow multi-layer structure 1735 may be immersed in a powder mixture containing 40 wt % chromium as source, 10 wt % ammonium chloride as activator and 50 wt % aluminum oxide as inert filler. The part may then be heated to a temperature of 1050° C. in an argon atmosphere and held for 3 hours. The coating thickness may be varied by changing the temperature, the time, or the amount of powder.

Aluminum may be deposited with a similar pack cementation process according to standard number ASTM B875 promulgated by ASTM International. The second hollow multi-layer structure 1735 may be heated for 2 hours at 1000° C. in a powder pack of 40 wt % Raney Ni/Al, 10 wt % ammonium chloride and 50 wt % aluminum oxide. The pack cementation processes, also referred to as vapor phase chromizing and aluminizing, form diffusion coatings, from which an alloy layer may subsequently be produced by the inward diffusion of the chromium or aluminum into the base material.

Other coating methods may be used as well, such as electrodeposition of chromium and/or non-aqueous electrodeposition of aluminum. DC bias field cathodic arc physical vapor deposition may be used, for example, and may have the advantage that a voltage bias applied to the structure improves non-line-of-sight deposition by attracting metal ions and charged particles. This method also allows deposition of multi-component alloys at once and achieves thicker coatings than standard sputtering methods. A 50 μm thick layer may be applied in 2 hours, for example.

Once the coatings are built up to the desired thickness and composition, a homogenization heat treatment is utilized, in an act 1650 (FIG. 16) to interdiffuse the metals and form a hollow structure 1740, having a cross section 1741 that may include (e.g., consist of) a single uniform layer 1745 of the targeted alloy. The uniform layer may have a composition that is uniform to within 10%, i.e., in which the molar concentration of each element varies by no more than 10%. This may then be followed by an ageing heat treatment to adjust the microstructure. Many different structures may be produced with this approach. Since electrodeposition is not a true non-line-of-sight process, coating thickness uniformity may be challenging to achieve with increasing part complexity. The finite rate of diffusion puts a limit on the coating thickness that may be homogenized in a reasonable time, but this issue may be mitigated by depositing multiple layers.

The layered approach to multi-element deposition provides a well understood method for determining homogenizing times and temperatures. The diffusion process can be modeled using the Fickian equations for diffusion along with well documented diffusivity values of the desired species. These diffusion models can be calculated prior to material production to develop a layering strategy, along with a homogenization time and temperature. Nickel and copper, which have an interdiffusion coefficient of $1.41 \times 10^{-10}$ m$^2$/s at 1000° C., are highly miscible species and diffuse quickly, allowing thick layers to be applied with minimal impact on the total interdiffusion time. For example, two 50 μm thick layers of Cu and Ni may interdiffuse into a Cu50Ni alloy within 24 hours at 1000° C. A more designed approach may be used for Co—Re alloys due to the low interdiffusivity (which may be $1.85 \times 10^{-17}$ m$^2$/s at 1050° C.) of rhenium at reasonably attainable temperatures. A different layering strategy based on multiple alternating thin layers may be used, for example. For example, alternating 12 μm thick layers of cobalt and 20 μm thick layers of rhenium may interdiffuse to form a substantially uniform alloy, with a composition of 80 wt % Re and 20 wt % Co, if heated to 1300° C. for about 24 hours.

The layering approach also provides additional routes to improve diffusivity of the species. Depending on the deposition strategy, grain size and stress can be controlled to promote faster diffusion. For example a faster electrodeposition rate may result in smaller grains and the stress in the deposit can be tailored with the plating bath chemistry. Decreasing the grain size increases the grain boundary area providing additional routes for grain boundary diffusion. Likewise stress in the alloy may increase the number of dislocations, including bulk dislocations and/or thickness misfit dislocations. In both cases these provide routes for pipe diffusion of species which may increase the observed local diffusivity of species, which may, as a result, increase substantially from documented bulk diffusivities. All of these processes may be modeled and a method and layer structure design may be selected based on the type of species being diffused and the ideal routes of diffusion in the structure.

Example 1: Electrodeposited Co—Re Truss

Figure 11:
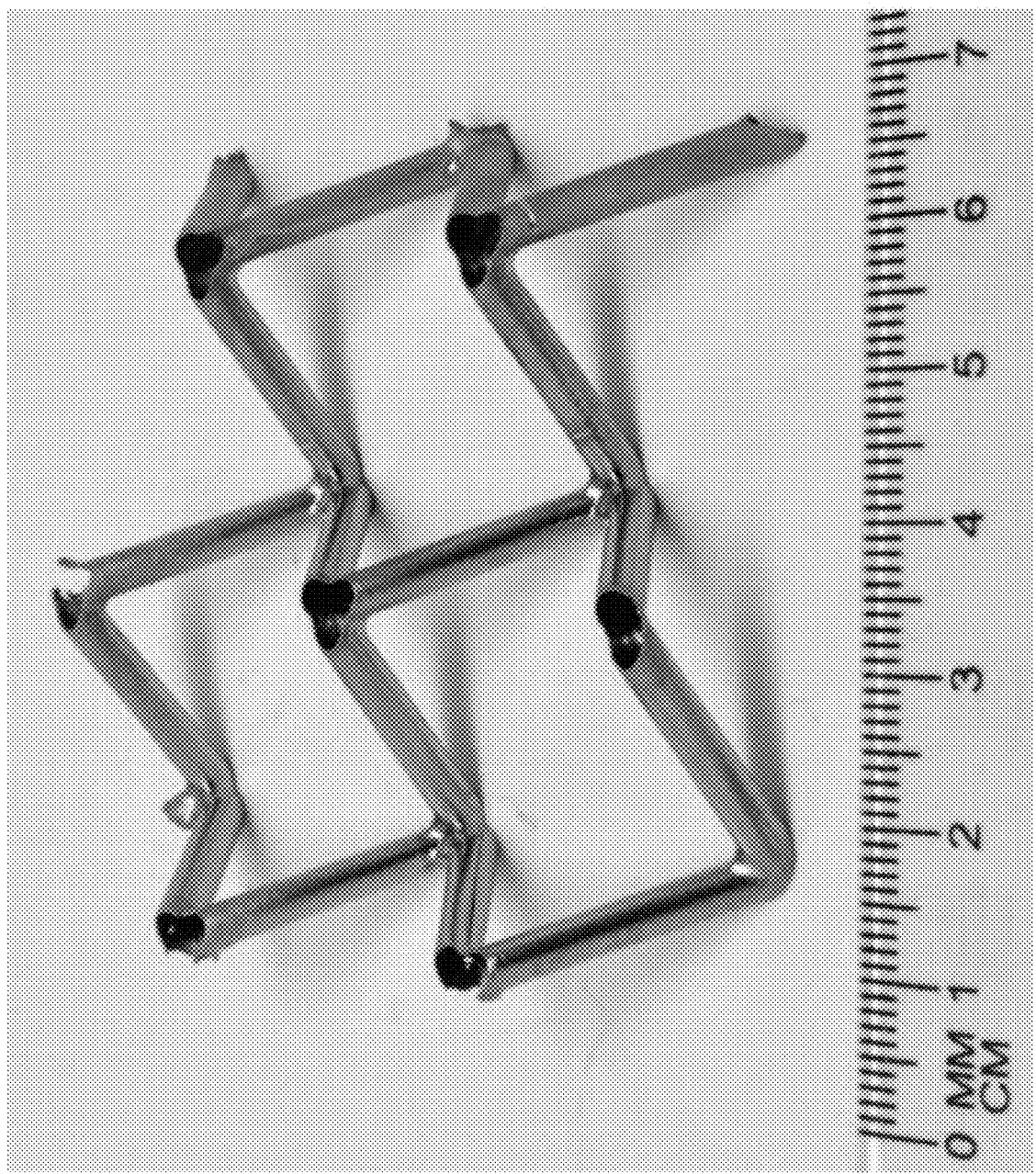

A polymer micro-truss manufactured as described above was metallized by evaporation of titanium to a thickness of 0.5 micrometer and platinum to a thickness of 0.1 micrometer. The metalized micro-truss was then electroplated with cobalt in an aqueous solution of 360 g/l CoSO$_4$, 45 g/l boric acid and 17 g/l NaCl. at 10 mA/cm$^2$ for 75 minutes to a thickness of approximately (about) 15 microns. The cobalt micro-truss was then plated in a cobalt rhenium plating solution. Improvements to the plating technology were made to improve the plating quality of the micro-truss. Dual platinum coated titanium mesh anodes were used to improve the current distribution on the micro-truss. The sample was racked with multiple wires to improve current distribution on the thin metal conductive layer, as will be understood by one of skill in the art. Plating was performed using a high level of agitation at the cathode to enable high mass transfer at the plating surface and to remove bubbles from the surface due to gas evolution, which may leave gas marks in cobalt and cobalt alloy deposition. The pH of the solution was maintained throughout the deposition with periodic additions of ammonium hydroxide. Deposition was performed at 65° C. and 50 mA/cm$^2$ for 1 hour resulting in a deposition thickness of 30 microns. The resulting alloy was analyzed by energy-dispersive X-ray spectroscopy (EDX) to confirm the Co—Re composition. The resulting micro-truss is shown in FIG. 11. Optional subsequent processing includes removing the polymer and/or adding additional metals or alloys to the existing metal.

Figure 12:
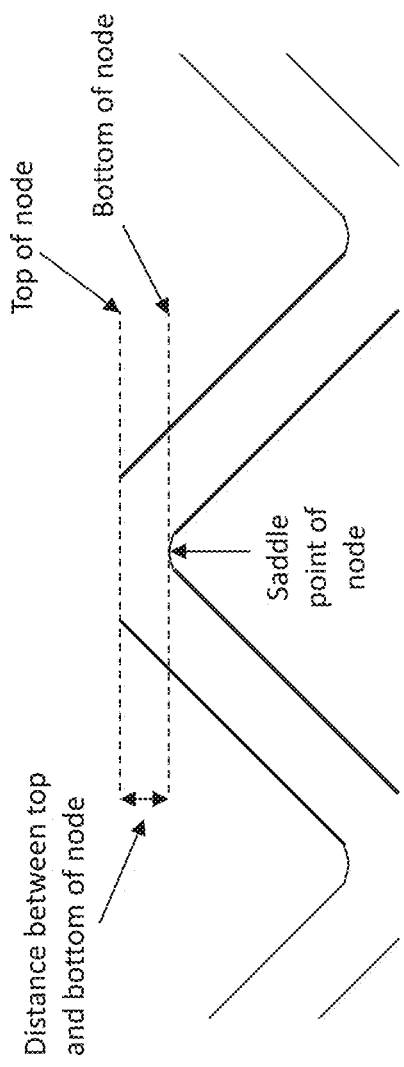

The strength of the core can be increased by truncating the nodes. One embodiment includes a core where the bottom of the hollow node is spaced from the top of the node at a distance of less than 15% of the core height as shown in FIG. 12. The bottom of the hollow node may coincide with a saddle point in the exterior surface of the hollow node. In one embodiment, the closer the bottom of the node is spaced to the top of the node, the greater the strength.

Figure 13:
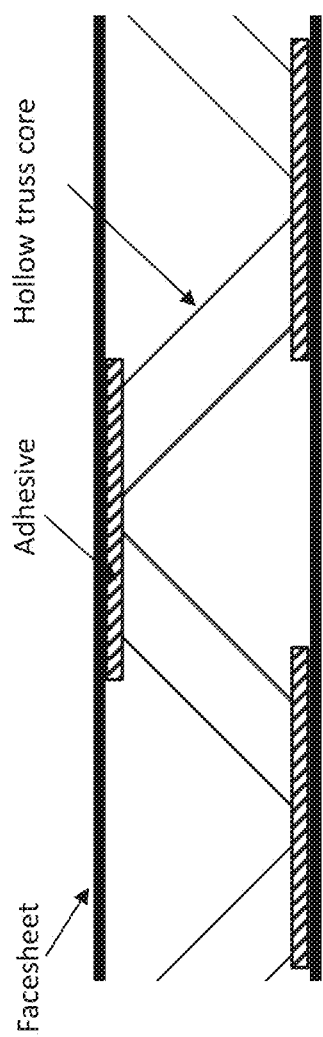

In one embodiment when attaching facesheets, measures are taken to ensure that the adhesive also bonds the bottom of the node directly to the facesheet as shown in FIG. 13. This ensures load transfer to a larger area of the node and decreases stress concentrations. Furthermore, this mitigates failure at the core—facesheet interface on loading. Also, the adhesive fixes the bottom of the node, so that no buckling or deformation can initiate there.

Figure 14A:
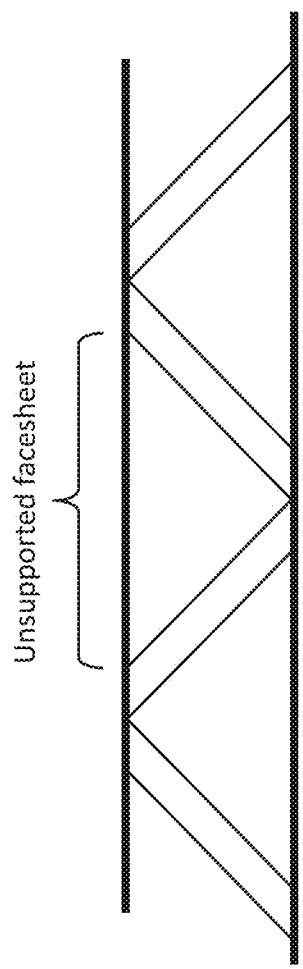
FIG. 14A is a schematic cross-sectional view of a truss core according to an embodiment of the present invention.
Figure 14B:
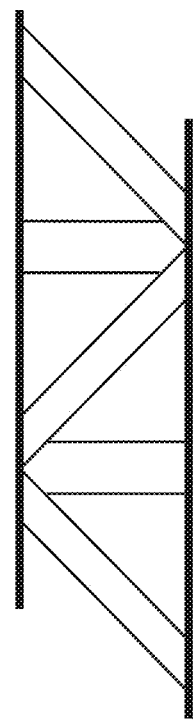
FIG. 14B is a schematic cross-sectional view of a truss core according to an embodiment of the present invention.
Figure 15:
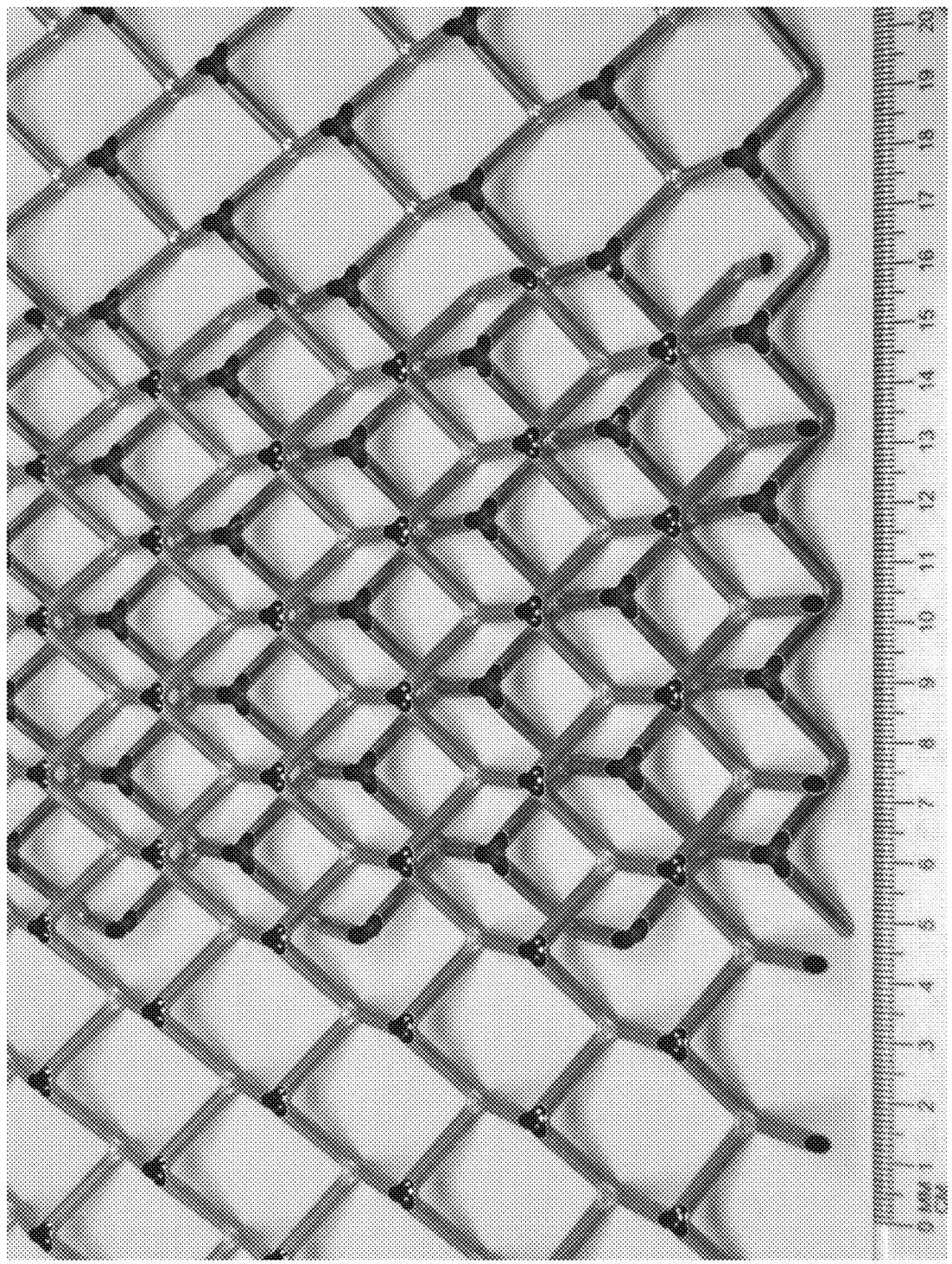

Tetrahedral (3-fold) cores can be interlaced to form a larger core. Thereby two cores are arranged to overlap as seen in FIGS. 14B and 15. This allows splicing smaller cores to form a larger core, and may reduce the amount of unsupported facesheet, as illustrated in FIGS. 14A and 14B.

FIG. 15 shows an upper core segment partially overlapping a lower core segment. A plurality of such lower core segments (e.g., square lower core segments) may be tiled together to cover a larger area, and a plurality of upper core segments (e.g., having the same size as the lower core segments) may then be tiled over the lower core segments (e.g., the upper core segments being offset from the lower core segments). A multitude of core segments with a square shape can thus be arranged into one large, continuous, uniform core by interlacing, e.g., every quarter of each core with a quarter of the adjacent core. In one embodiment, continuous facesheets are attached to such a spliced core.

Example 2: Alloys

A) Ni—Cu—Al—Ti System (Monel)

One example of an alloy that may be fabricated according to embodiments of the present invention is a nickel-copper alloy with a target composition close to that of Monel K-500 (Ni with 34 wt % Cu, 1 wt % Al, 0.5 wt % Ti). In some embodiments any of these components may be present in a larger or smaller proportion by 10% of its respective proportion. Monel is an alloy that may be employed in marine and drilling operations due to its corrosion resistance and ability to operate above ambient temperatures. Many applications include use with flowing sea water, and the ability to architect thin walled structures may be advantageous for the construction of high efficiency heat exchangers. The layered approach is particularly effective in the Ni—Cu system due to the high solubility of each element and rapid diffusion at elevated temperatures. Aluminum and titanium may be added in small amounts to promote the precipitation of L12 Ni(Al, Ti) phases. These precipitates are stable in the matrix at elevated temperatures and impede dislocation motion strengthening the alloy with a yield strength of about 790 MPa. The L12 phase helps maintain over 75% of the room temperature yield strength at over 450° C. Likewise the aluminum additions may help form a stable aluminum oxide surface further increasing corrosion and heat resistance. Thin walled structures of this alloy may be produced by first depositing 1 µm of Ti by electron beam evaporation, followed by electrodeposition of 25 µm copper and 46 µm of nickel and subsequent removal of the positive polymer template 1715. Approximately 3 µm of aluminum may then be deposited by pack cementation resulting in a thin walled structure with 75 µm thick walls, after homogenization.

B) Ni—Cr—Al System (Nickel Based Superalloy)

Another example of an alloy fabricated according to embodiments of the present invention is a gamma-gamma prime super alloy based on nickel with additions of chromium, aluminum and titanium. This is a simplified version of common super alloys used in the hot section of gas turbines with operating temperatures above 900° C. This alloy derives its strength from the precipitation of fine L12 Ni(Al, Cr) phases which inhibit dislocation motion at elevated temperatures. This may form an idealized brick and mortar gamma (Ni)-gamma prime (Ni (Al, Cr)) structure.

Due to the high volume fraction of L12 phases and high solvus temperature of these phases the alloy may be operated at very high temperatures for extended periods of time with minimal associated creep. Typical yield strength values achieved at 900° C. are in the range of 500 MPa-600 MPa.

Figure 18A:
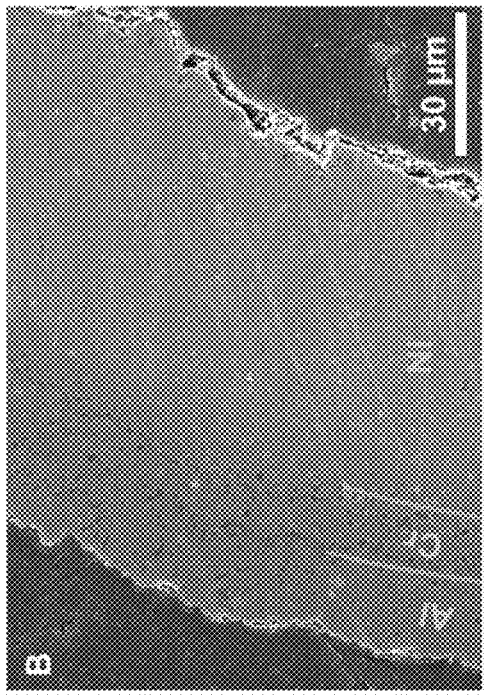
FIG. 18A is a scanning electron microscope (SEM) micrograph taken in a process of fabrication of a thin walled Ni—Cr—Al—Ti superalloy structure, according to an embodiment of the present invention.
Figure 18B:
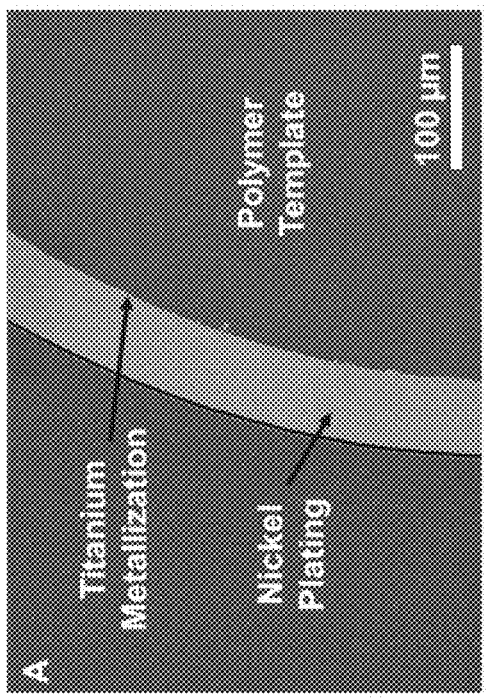
FIG. 18B is a scanning electron microscope (SEM) micrograph taken in a process of fabrication of a thin walled Ni—Cr—Al—Ti superalloy structure, according to an embodiment of the present invention.
Figure 18C:
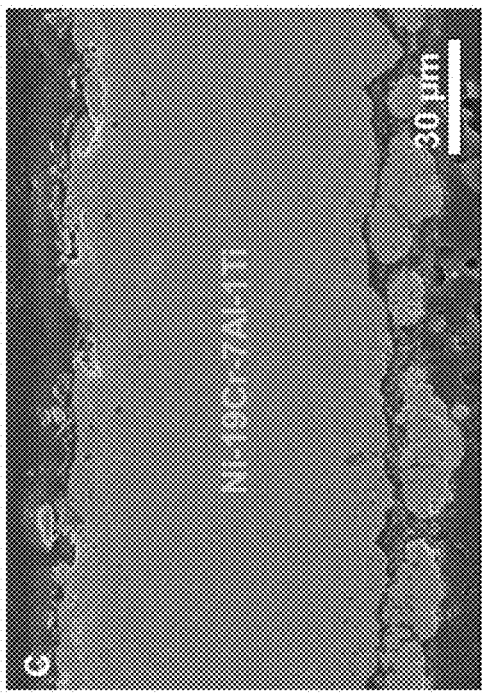
FIG. 18C is a scanning electron microscope (SEM) micrograph taken in a process of fabrication of a thin walled Ni—Cr—Al—Ti superalloy structure, according to an embodiment of the present invention.

FIGS. 18A-18C show scanning electron microscope (SEM) micrographs after key steps of fabrication of a thin walled Ni—Cr—Al—Ti superalloy structure. FIG. 18A shows nickel electrodeposited onto the positive polymer template 1715. FIG. 18B shows Cr and Al deposited by pack cementation, and FIG. 18C shows the structure after homogenization heat treatment.

To fabricate thin walled structures of nickel based superalloys, 3D printed polymer parts may first be metallized with a 1 µm thick Ti layer and a 0.1 µm thick Pt layer by electron beam evaporation. 60 µm of nickel may then be deposited by electrodeposition (FIG. 18A), followed by removal of the polymer. Subsequently chromium and aluminum may be deposited by pack cementation. FIG. 18B shows a cross-section after the Cr and Al deposition. The dark spots are intermetallic inclusions formed during each coating step. The process conditions may be tailored to deposit Cr and Al in the proportions of the target alloy. The mass gain during pack cementation may be tuned to achieve a nickel alloy with 19 wt % Cr, 7 wt % Al and 1 wt % Ti. In some embodiments any of these components may be present in a larger or smaller proportion by 20% of its respective proportion. Starting with 60 µm Ni and 1 µm Ti this may result in approximately 100 µm wall thickness. An additional heat treatment of 24 hours at 1100° C. may be employed to fully homogenize the alloy coating (FIG. 18C). The final step may be an ageing heat treatment of 18 hours at 850° C. to establish the gamma-gamma prime microstructure. Although modern superalloys may have 10 or more alloying elements, this simple Ni—Cr—Al—Ti alloy has the key components to provide high temperature strength ($\gamma/\gamma'$ microstructure) and oxidation resistance (Cr and Al). Small amounts of other metals and/or other elements may, in some embodiments, be added by electron beam evaporation, sputtering and/or chemical vapor deposition (CVD) and diffused in. For example trace amounts (<0.5%) of B and Y may be included to improve adhesion of the oxide scale, B, Zr and Hf may be included to strengthen the grain boundaries, and/or C may be included to form carbides. Performance similar to that of Inconel and modern superalloys may be achieved with this approach.

C) Re—Co System (Refractory Alloy)

Figure 19:
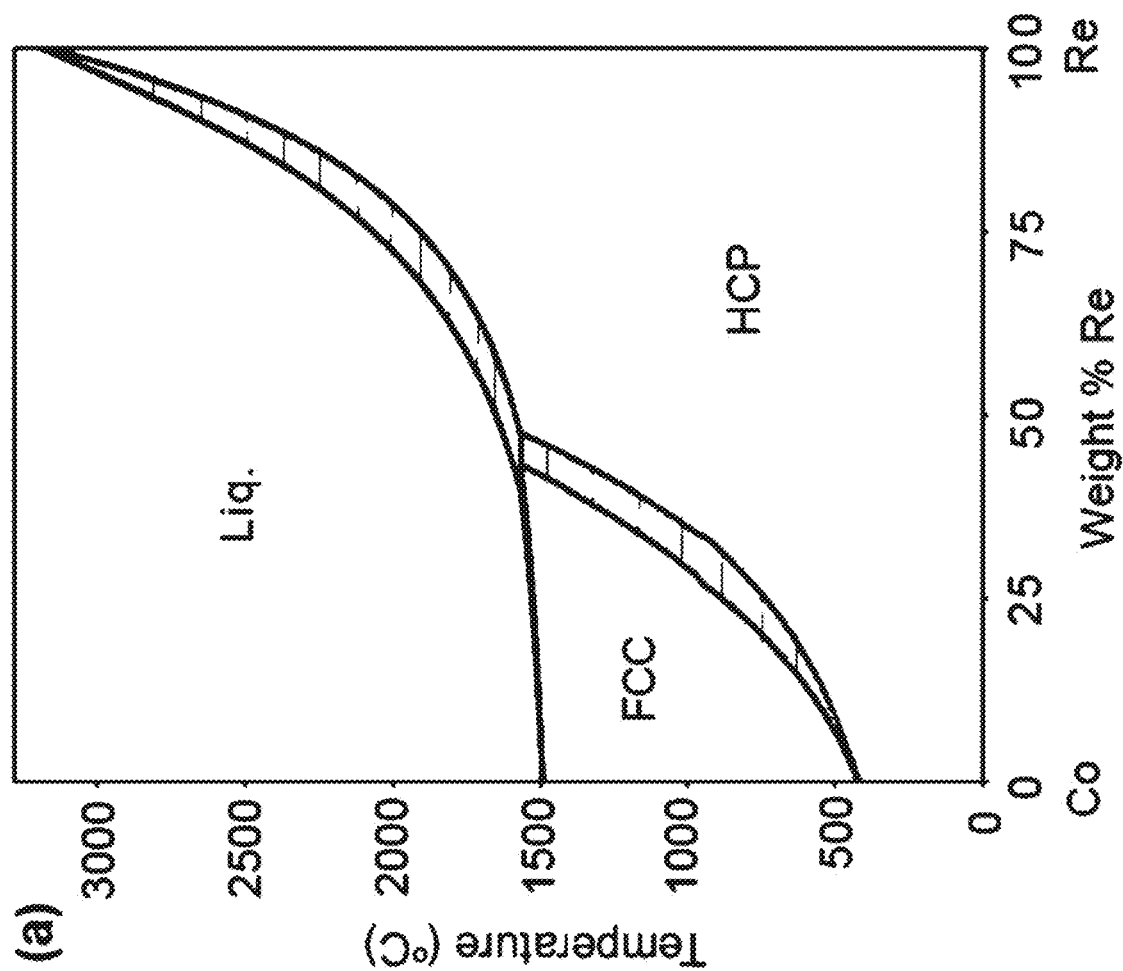

Another example of an alloy fabricated according to embodiments of the present invention is one of a new generation of ultra-high temperature alloys, based on the rhenium-cobalt alloy system. The Re—Co system is desirable due to the formation of a solid solution phase with a near linear increase in melting temperature with increasing Re content, as shown in the phase diagram of FIG. 19. Re—Co alloys are therefore candidates for application at temperatures of 1500° C. or higher, where iron and/or nickel based alloys may not operate. Pure rhenium has a yield strength of 600 MPa at 25° C. and a yield strength of 370 MPa at 1370° C. and may be used for small rocket engine thrusters that are exposed to temperatures up to 2200° C. It is expected that addition of Co to Re leads to solid solution strengthening, but the concomitant reduction in melting point will also reduce the high temperature strength. As such, cobalt and rhenium may be deposited and homogenized to form, for example, a Re-20 wt % Co alloy or Re-40 wt % Co alloy. The incorporation of rhenium into alloys at high levels is generally limited due to its cost, however as a thin walled structure the high temperature advantage can be utilized with minimal use of material. Rhenium may, however, suffer from severe oxidation. Al and Cr may be included as potential alloying elements to help develop a stable oxide layer. Moreover, there are applications for rhenium were oxidation is not limiting or can be mitigated with an iridium coating, such as in thrusters for in-space propulsion.

Example 3: Further Hollow Truss Structures

Figure 20C:
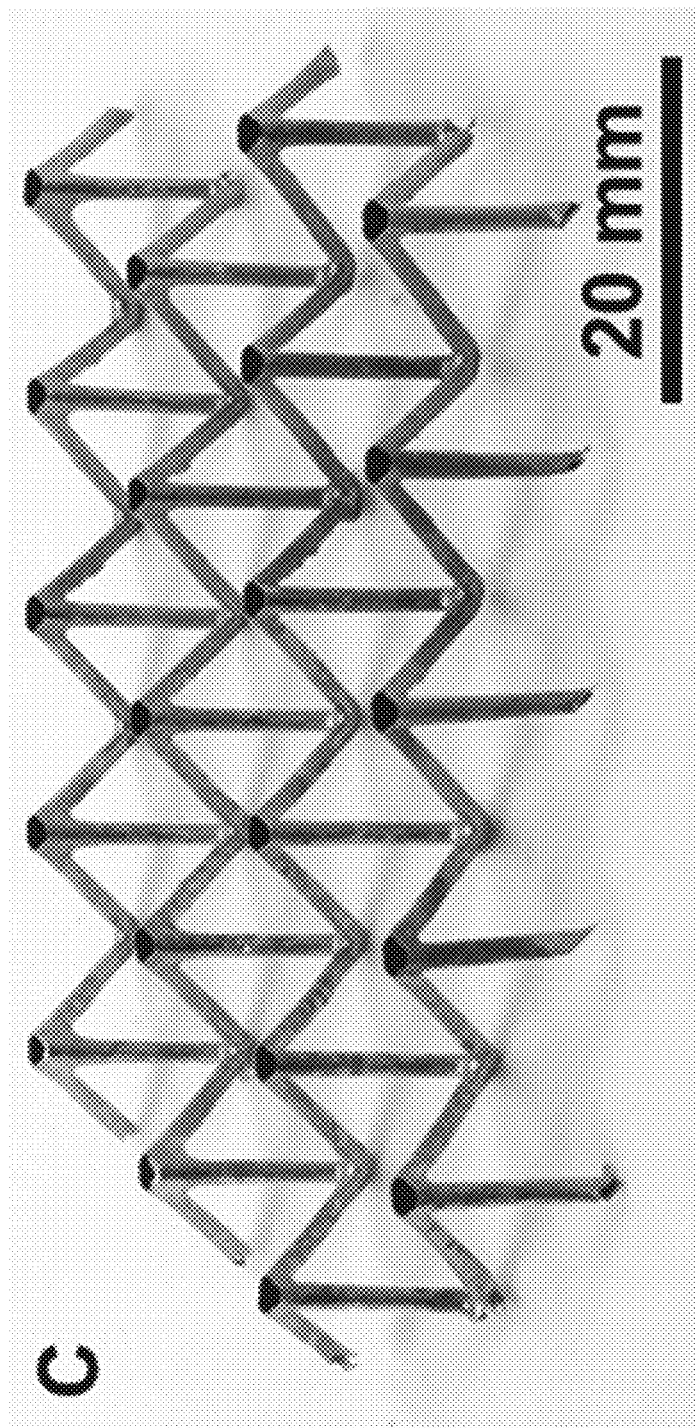
FIG. 20C is a photograph of a hollow truss structure, according to an embodiment of the present invention.

A polymer truss structure may be fabricated with a self-propagating waveguide method and employed as the positive polymer template 1715, as mentioned above. Such truss structures may then be metallized with 0.5 μm Ni and 0.1 μm Pt by electron-beam evaporation. Subsequently 25 μm of cobalt may be deposited by electroplating. Then 50 μm of rhenium and cobalt may be co-deposited as described above, followed by another layer of 25 μm cobalt. The Re rich layer may be encased in Co layers to avoid stress cracking during removal of the polymer and subsequent high temperature annealing. The structure formed on the truss template may be a highly stressed FCC structure, as indicated by X-ray diffraction analysis (XRD). Upon heating the material may undergo a non-uniform phase transformation which may result in cracking when not mechanically constrained by additional Co layers on both sides of the film. By using a substrate with a different geometry, and/or by fine tuning the plating process, it may be possible to reduce stress build-up during plating. The composition of the structure may be 80 wt % Re and 20 wt % Co, as measured by electron dispersive x-ray analysis, which according to the phase diagram (FIG. 19) has a melting point (solidus) of 2000° C., substantially higher than a steel or nickel alloy. After removing the polymer with 1M NaOH solution, the hollow truss sample may be homogenized at 1200° C. for 50 hours. Micrographs before and after homogenization are shown in FIGS. 20A and 20B. As may be seen from FIGS. 20A and 20B homogenization may be achieved although Re is an extremely slow diffusing species. This may be due to both the layering strategy and the use of thin walls as opposed to bulk structures. The Vickers hardness of the alloy structure may be 480±50 HV0.2 after homogenization, as measured using a Vickers hardness tester. This hardness corresponds to a yield strength of 1600 MPa. FIG. 20C shows a high temperature Re—Co hollow truss structure formed in this manner.

Figure 21A:
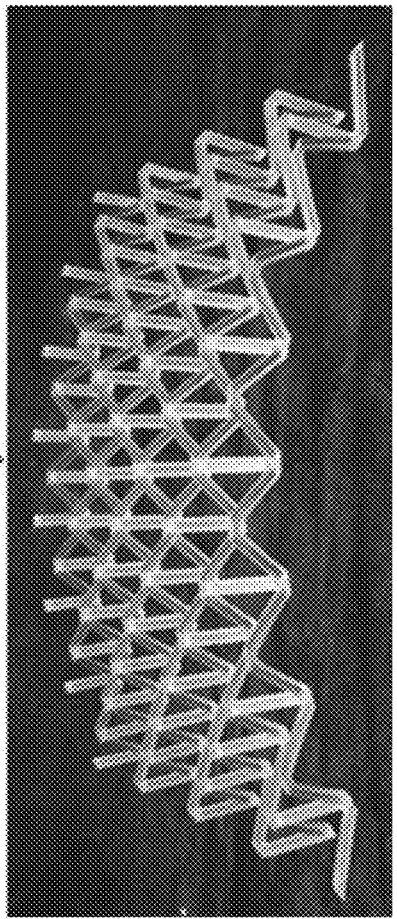
FIG. 21A is a photograph of a template in the shape of a truss, according to an embodiment of the present invention.
Figure 21B:
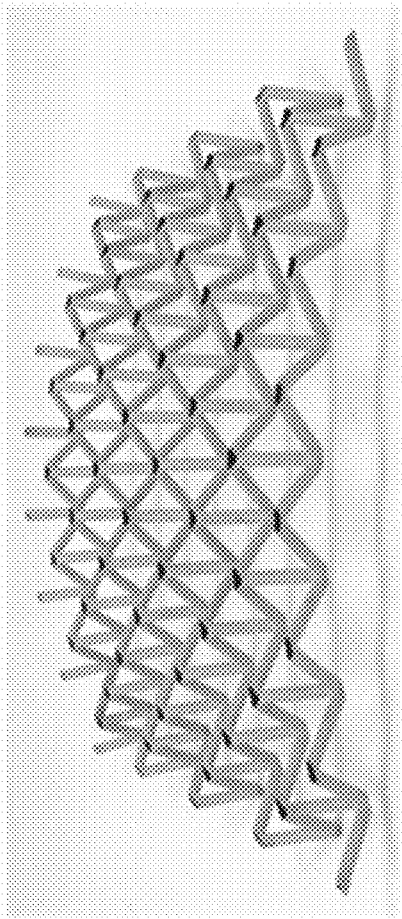
FIG. 21B is a photograph of a hollow truss structure, according to an embodiment of the present invention.
Figure 21C:
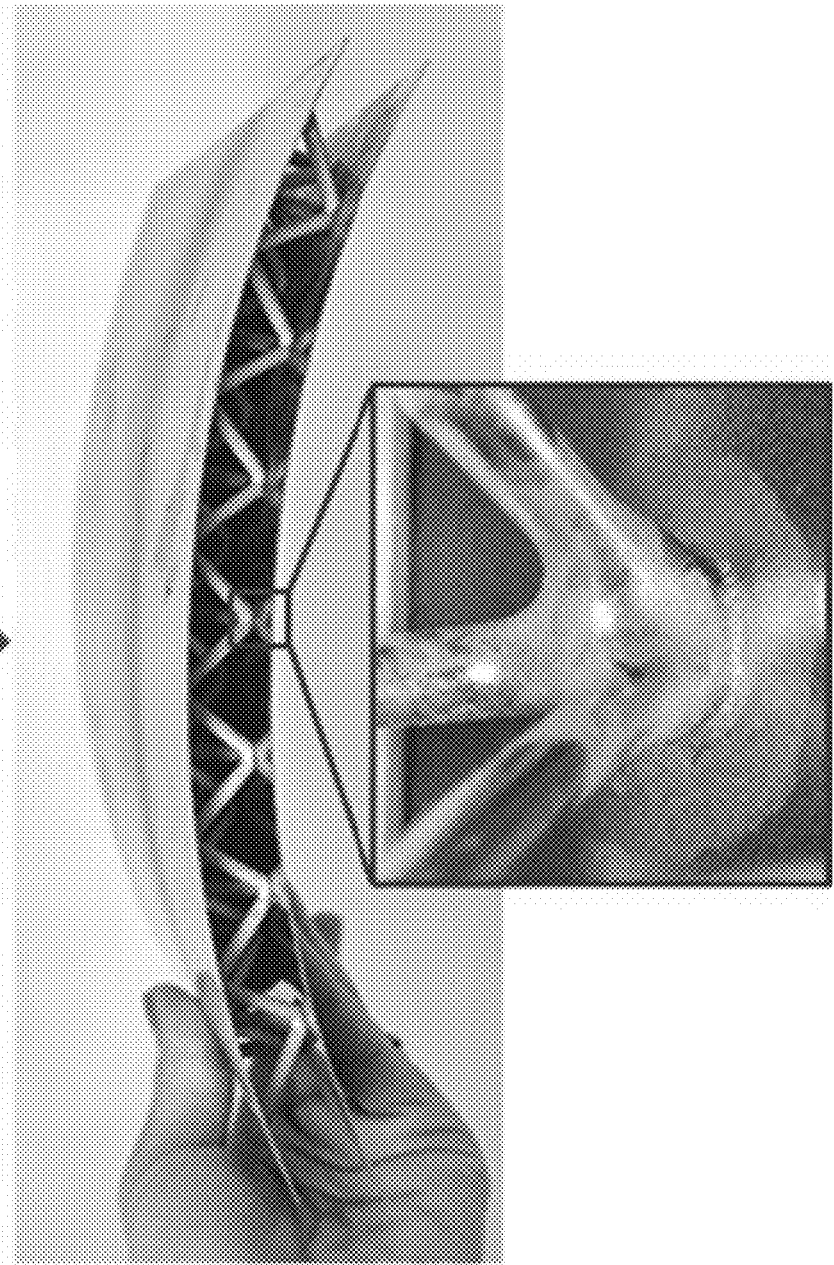
FIG. 21C includes a photograph, and an inset enlarged portion of the photograph, of a sandwich structure, according to an embodiment of the present invention.

In another embodiment, a polymer truss core (FIG. 21A) was fabricated using additive manufacturing, Ti, Ni, Cr and Al were deposited and the truss core was removed to form a hollow structure (FIG. 21B), and the structure was subjected to a homogenizing heat treatment. The hollow structure was then brazed to Inconel 718 facesheets and aged, to form the high temperature nickel superalloy sandwich panel (20 cm×20 cm×1.5 cm) shown in FIG. 21C.

Example 4: Rocket Engine Chambers and Nozzles

Figure 22A:
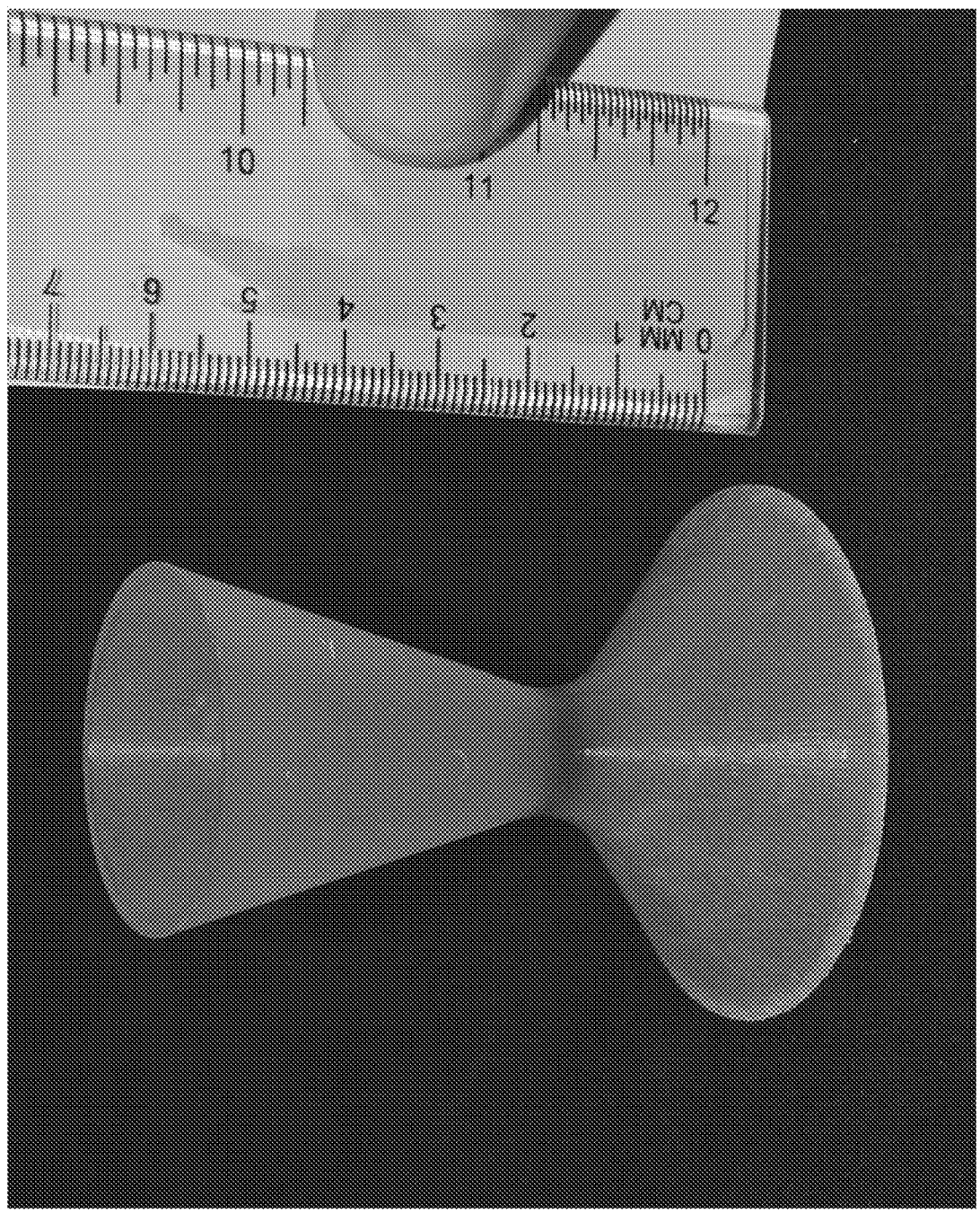
FIG. 22A is a perspective view photograph of a polymer template for a thruster according to an embodiment of the present invention.

Small rocket engine thrusters for launch vehicles and small satellite propulsion may also be fabricated according to embodiments of the present invention. The chambers and nozzles of such rocket engines should be produced from a high temperature material to reduce or eliminate cooling requirements that affect the engine efficiency. A positive polymer template 1715 for a thruster, such as the one shown in FIG. 22A, may be 3D printed via stereolithography.

In one embodiment, the polymer thruster may then be metallized with Ti, electroplated with nickel and diffusion coated with Cr and Al as described above, resulting in a wall thickness of approximately 150 μm.

Figure 22B:
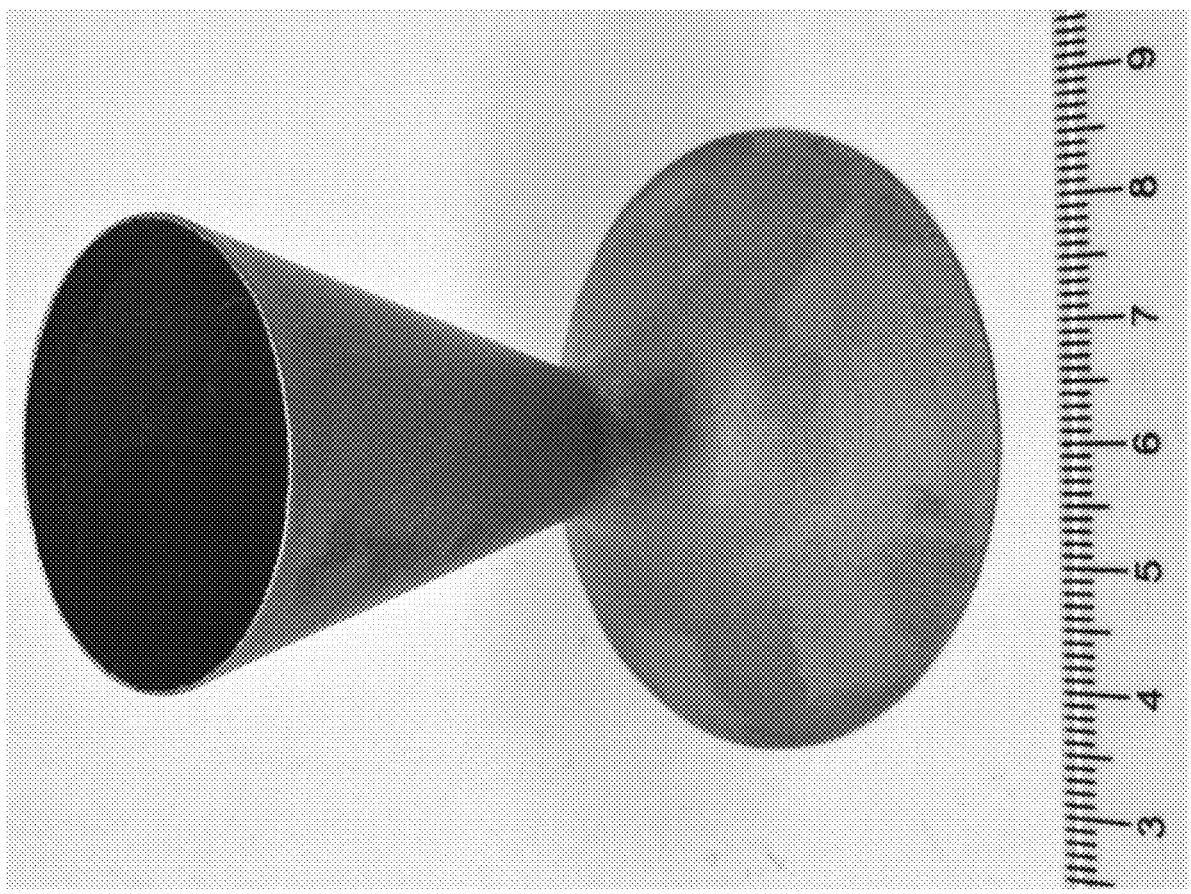
FIG. 22B is a perspective view photograph of a thruster according to an embodiment of the present invention.

In another embodiment, the positive polymer template for the thruster may be rendered conductive by spray coating it with a conductive silver paint. The part may be electroplated with 100 microns of nickel, the polymer template may be etched out with 2 molar sodium hydroxide solution, and a diffusion chromium coating may then be deposited on the hollow nickel part by pack cementation, resulting in approximately (about) 32 microns of effective chromium thickness. A diffusion aluminum coating may then be deposited on the hollow part by pack cementation, resulting in approximately (about) 31 microns of effective aluminum thickness. The part may then be heat treated at 1100° C. for 50 hours in argon to interdiffuse Ni, Cr and Al, and simple Inconel-type alloy may be formed. The alloy may then be aged at 900° C. for 12 hours to establish a gamma-gamma prime microstructure that, in some embodiments, is a characteristic of superalloys and provides good high temperature mechanical properties. The resulting thruster shell is shown in FIG. 22B.

Similarly, higher temperature capable thrusters may be fabricated from a Re—Co alloy as outlined above.

In view of the foregoing, embodiments of the present invention provide a thin-walled metal part, and a method to fabricate such a part out of various alloys. A plurality of layers are formed, each of the layers being formed on a polymer template or on a previously formed layer. A homogenizing heat treatment is used to cause chemical elements in the layers to interdiffuse, to form a single continuous layer with a substantially uniform alloy composition.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present. As used herein, two, three, or more layers are said to be "coupled with" each other, if they are in direct or indirect contact. For example, if a third layer is directly on a second layer, which is directly on a first layer, the first, second, and third layers may be said to be coupled with each other.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

As used herein, an elemental thickness of a layer is defined to be the thickness of the layer of the element as deposited. Aluminum and chromium typically react with nickel or cobalt when they are deposited at elevated temperatures by pack cementation or CVD and form an intermetallic. Therefore the thickness of a layer is the thickness that was added by the deposition, even though after the deposition there is a NiAl layer for example.

Although limited embodiments of a curved high temperature alloy sandwich panel with a truss core and fabrication method have been specifically described and illustrated herein, many modifications and variations will be apparent to those skilled in the art. Accordingly, it is to be understood that curved high temperature alloy sandwich panel with a truss core and fabrication method employed according to principles of this invention may be embodied other than as specifically described herein. The invention is also defined in the following claims, and equivalents thereof.

What is claimed is:

1. A method for forming a thin-walled structure, the method comprising:
    forming a polymer template;
    forming a plurality of coating layers, each of the coating layers being formed on the polymer template or on a previously formed layer, the forming of the plurality of coating layers comprising:
        forming a first coating layer on the polymer template, the first coating layer comprising one or more chemical elements, including at least 1% by weight of a first metal chemical element, the first coating layer having a thickness of 1 micron or less;
        forming a second coating layer on the first coating layer, the second coating layer comprising one or more chemical elements, including at least 1% by weight of a second metal chemical element, different from the first metal chemical element, wherein the forming of the second coating layer comprises co-depositing cobalt and rhenium utilizing electrodeposition;
    removing the polymer template; and
    performing a heat treatment of one or more of the plurality of coating layers, after removing the polymer template, the performing of the heat treatment comprising heating the plurality of coating layers to a first temperature and maintaining the plurality of coating layers at or above the first temperature during a first time interval, the first temperature and the first time interval being selected such that the chemical elements of the first coating layer and the chemical elements of the second coating layer interdiffuse to form a single continuous layer having a thickness less than 500 microns and comprising two different chemical elements, each chemical element of the single continuous layer having a molar concentration varying by less than 10% within the single continuous layer.

2. The method of claim 1, wherein the removing of the polymer template is performed before the forming of the second coating layer.

3. The method of claim 1, wherein the forming of the first coating layer comprises depositing the first coating layer utilizing a process selected from the group consisting of electrodeposition, electroless deposition, chemical vapor deposition, physical vapor deposition, spray coating, and combinations thereof.

4. The method of claim 3, wherein the forming of the first coating layer comprises depositing a first sub-layer of titanium utilizing electron beam evaporation and, after depositing the first sublayer of titanium, depositing a second sub-layer of platinum utilizing electron beam evaporation.

5. The method of claim 4, wherein the removing the polymer template comprises removing the polymer template with a polymer removal fluid, the method further comprising removing a portion of the first coating layer in an area sufficiently large to allow the polymer removal fluid to access the polymer template.

6. The method of claim 1, wherein:
    the removing of the polymer template is performed after the forming of the second coating layer, and
    the forming of the plurality of coating layers further comprises forming a third coating layer comprising a third metal chemical element.

7. The method of claim 6, wherein the forming of the third coating layer comprises depositing material utilizing a process selected from the group consisting of aluminum diffusion coating, chromium diffusion coating, titanium diffusion coating, cathodic arc deposition, direct current (DC) bias field cathodic arc physical vapor deposition, plasma enhanced magnetron sputtering, and pack cementation.

8. The method of claim 6, wherein the forming of the third coating layer comprises depositing chromium or aluminum utilizing pack cementation.

9. The method of claim 1, wherein the single continuous layer comprises:
   a nominal composition consisting of the following nominal proportions:
      70% by weight rhenium; and
      30% by weight cobalt, or
   a composition in which each component differs from its respective nominal proportion by +/−30% of its respective proportion.

10. The method of claim 9, wherein the composition includes:
   between 10% by weight and 30% by weight chromium and/or
   between 3% by weight and 15% by weight aluminum.

11. The method of claim 1, wherein the forming of the polymer template comprises utilizing an act selected from the group consisting of stereolithography, three dimensional printing, additive manufacturing and injection molding.

12. The method of claim 1, wherein the removing of the polymer template comprises utilizing an act selected from the group consisting of a base etching, an acid etching, a plasma etching, a solvent bath processing, a thermal decomposition and a melting.

13. The method of claim 1, wherein the first temperature is at least 1100° C. and the first time interval is at least 24 hours.

14. A method for forming a thin-walled structure, the method comprising:
   forming a polymer template;
   forming a plurality of coating layers, each of the coating layers being formed on the polymer template or on a previously formed layer, the forming of the plurality of coating layers comprising:
      forming a first coating layer on the polymer template, the first coating layer comprising one or more chemical elements, including at least 1% by weight of a first metal chemical element;
      forming a second coating layer on the first coating layer, the second coating layer comprising one or more chemical elements, including at least 1% by weight of a second metal chemical element, different from the first metal chemical element;
   removing the polymer template; and
   performing a heat treatment of one or more of the plurality of coating layers, after removing the polymer template, the performing of the heat treatment comprising heating the plurality of coating layers to a first temperature and maintaining the plurality of coating layers at or above the first temperature during a first time interval, the first temperature and the first time interval being selected such that the chemical elements of the first coating layer and the chemical elements of the second coating layer interdiffuse to form a single continuous layer having a thickness less than 500 microns and comprising two different chemical elements, each chemical element of the single continuous layer having a molar concentration varying by less than 10% within the single continuous layer,
   wherein the single continuous layer comprises:
   a nominal composition consisting of the following nominal proportions:
      73% by weight nickel;
      19% by weight chromium;
      7% by weight aluminum; and
      1% by weight titanium, or
   a composition in which each of nickel, chromium, aluminum, and titanium differs from its respective nominal proportion by +/−20% of its respective proportion.

15. A method for forming a thin-walled structure, the method comprising:
   forming a polymer template;
   forming a plurality of coating layers, each of the coating layers being formed on the polymer template or on a previously formed layer, the forming of the plurality of coating layers comprising:
      forming a first coating layer on the polymer template, the first coating layer comprising at least 1% by weight of a first metal chemical element;
      forming a second coating layer on the first coating layer, the second coating layer comprising at least 1% by weight of a second metal chemical element, different from the first metal chemical element;
   removing the polymer template; and
   performing a heat treatment of one or more of the plurality of coating layers, after removing the polymer template, the performing of the heat treatment comprising heating the plurality of coating layers to a first temperature and maintaining the plurality of coating layers at or above the first temperature during a first time interval, the first temperature and the first time interval being selected such that the chemical elements of the first coating layer and the chemical elements of the second coating layer interdiffuse to form a single continuous layer having a thickness less than 500 microns and comprising two different chemical elements, each chemical element of the single continuous layer having a molar concentration varying by less than 10% within the single continuous layer,
   wherein the first coating layer has a thickness of between 5 microns and 300 microns, and comprises, as a major component, a substance selected from the group consisting of nickel, cobalt, iron, and combinations thereof, and
   wherein the forming of the second coating layer comprises:
      depositing one or more sub-layers of chromium, to a combined thickness of 10% to 40% of the thickness of the first coating layer, utilizing an act selected from the group consisting of electroplating, chemical vapor deposition and pack cementation;
      depositing one or more sub-layers of aluminum, to a combined thickness of 10% to 40% of the thickness of the first coating layer, utilizing an act selected from the group consisting of electroplating, chemical vapor deposition and pack cementation;
      depositing, to a thickness of 1% to 15% of the thickness of the first coating layer, a layer comprising, as a major component, a substance selected from the group consisting of Mo, W, Ta, Ti, and Re, and combinations thereof; and
      depositing, to a thickness of less than 2% of the thickness of the first coating layer, a layer comprising, as a major component, a substance selected from the group consisting of Si, C, B, Zr, Hf, Y, and combinations thereof.

16. A method for forming a thin-walled structure, the method comprising:
- forming a polymer template;
- forming a plurality of coating layers, each of the coating layers being formed on the polymer template or on a previously formed layer, the forming of the plurality of coating layers comprising:
  - forming a first coating layer on the polymer template, the first coating layer comprising one or more chemical elements, including at least 1% by weight of a first metal chemical element;
  - forming a second coating layer on the first coating layer, the second coating layer comprising one or more chemical elements, including at least 1% by weight of a second metal chemical element, different from the first metal chemical element;
- removing the polymer template; and
- performing a heat treatment of one or more of the plurality of coating layers, after removing the polymer template, the performing of the heat treatment comprising heating the plurality of coating layers to a first temperature and maintaining the plurality of coating layers at or above the first temperature during a first time interval, the first temperature and the first time interval being selected such that the chemical elements of the first coating layer and the chemical elements of the second coating layer interdiffuse to form a single continuous layer having a thickness less than 500 microns and comprising two different chemical elements, each chemical element of the single continuous layer having a molar concentration varying by less than 10% within the single continuous layer, wherein:
the first coating layer comprises, as a major component, a combination of:
- cobalt; and
- rhenium in a concentration of 10% by weight to 70% by weight;

and the second coating layer comprises, as a major component, a substance selected from the group consisting of chromium, nickel, aluminum, tantalum, silicon, and combinations thereof.

* * * * *